(12) United States Patent
Roy et al.

(10) Patent No.: US 12,039,430 B2
(45) Date of Patent: Jul. 16, 2024

(54) ELECTRONIC DEVICE AND METHOD FOR INFERENCE BINARY AND TERNARY NEURAL NETWORKS

(71) Applicant: Samsung Electronics Co., Ltd., Suwon-si (KR)

(72) Inventors: Arnab Roy, Bangalore (IN); Saptarsi Das, Bangalore (IN); Ankur Deshwal, Bangalore (IN); Kiran Kolar Chandrasek Haran, Bangalore (IN); Sehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 900 days.

(21) Appl. No.: 17/098,589

(22) Filed: Nov. 16, 2020

(65) Prior Publication Data

US 2021/0150313 A1    May 20, 2021

(30) Foreign Application Priority Data

Nov. 15, 2019   (IN) .............................. 201941046680
Oct. 22, 2020   (IN) ............................. 2019 41046680
Nov. 6, 2020    (KR) ........................ 10-2020-0148127

(51) Int. Cl.
    *G06N 3/04*      (2023.01)
    *G06F 7/544*     (2006.01)
    *G06N 3/045*     (2023.01)

(52) U.S. Cl.
    CPC ........... *G06N 3/045* (2023.01); *G06F 7/5443* (2013.01)

(58) Field of Classification Search
    CPC ....... G06N 3/045; G06N 3/063; G06F 7/5443
    See application file for complete search history.

(56) References Cited

U.S. PATENT DOCUMENTS 10,387,771 B2 *  8/2019  Judd ...................... G06N 3/049
10,997,496 B2 *  5/2021  Dally ..................... G06F 7/523
(Continued)

FOREIGN PATENT DOCUMENTS

CA     2635227 A1 *   7/2007  ....... G06F 16/90344
CN  100437828 C *  11/2008  ............. G11C 15/04
(Continued)

OTHER PUBLICATIONS

Haidar, Ali, et al., "A Novel Neural Network Ternary Arithmetic Logic Unit", ITC-CSCC: International Technical Conference on Circuits Systems, Computers and Communications, 2008.
(Continued)

*Primary Examiner* — Hassan Mrabi
(74) *Attorney, Agent, or Firm* — NSIP Law

(57) ABSTRACT

A method for computing an inner product on a binary data, a ternary data, a non-binary data, and a non-ternary data using an electronic device. The method includes calculating the inner product on a ternary data, designing a fused bitwise data path to support the inner product calculation on the binary data and the ternary data, designing a FPL data path to calculate an inner product between one of the non-binary data and the non-ternary data and one of the binary data and the ternary data, and distributing the inner product calculation for the binary data and the ternary data and the inner product between one of the non-binary data and the non-ternary data and one of the binary data and the ternary data in the fused bitwise data path and the FPL data path.

22 Claims, 20 Drawing Sheets

(56) References Cited

U.S. PATENT DOCUMENTS

| | | | | |
|---|---|---|---|---|
| 11,663,490 | B1* | 5/2023 | Enumula | G06N 3/10 706/44 |
| 11,741,348 | B2* | 8/2023 | Nakahara | G06N 3/045 706/26 |
| 2012/0257506 | A1* | 10/2012 | Bazlamacci | H04L 45/74591 709/212 |
| 2016/0054979 | A1 | 2/2016 | Okumura | |
| 2017/0286830 | A1* | 10/2017 | El-Yaniv | G06N 3/045 |
| 2018/0032844 | A1* | 2/2018 | Yao | G06V 10/20 |
| 2018/0307950 | A1* | 10/2018 | Nealis | G06F 9/3851 |
| 2019/0050325 | A1* | 2/2019 | Malladi | G06F 12/0862 |
| 2019/0056916 | A1 | 2/2019 | Varma et al. | |
| 2019/0065208 | A1* | 2/2019 | Liu | G06N 3/04 |
| 2019/0102671 | A1 | 4/2019 | Cohen et al. | |
| 2019/0102672 | A1* | 4/2019 | Bifulco | G06N 3/04 |
| 2019/0155575 | A1* | 5/2019 | Langhammer | G06F 7/485 |
| 2019/0244087 | A1* | 8/2019 | Park | G06N 3/045 |
| 2019/0251425 | A1* | 8/2019 | Jaffari | G06V 10/764 |
| 2020/0097816 | A1* | 3/2020 | Wu | G06N 3/063 |
| 2020/0111235 | A1* | 4/2020 | Chen | G06N 3/063 |
| 2020/0117982 | A1* | 4/2020 | Chiu | G06N 3/045 |
| 2020/0134461 | A1* | 4/2020 | Chai | G06N 3/084 |
| 2020/0151556 | A1* | 5/2020 | Chen | G06N 5/04 |
| 2020/0210759 | A1* | 7/2020 | Chou | G06N 5/04 |
| 2020/0234112 | A1* | 7/2020 | Wang | G06N 3/08 |
| 2020/0234137 | A1* | 7/2020 | Chen | G06N 3/084 |
| 2020/0311533 | A1* | 10/2020 | Agrawal | G11C 13/003 |
| 2020/0364031 | A1* | 11/2020 | Makino | G06F 7/57 |
| 2021/0124793 | A1* | 4/2021 | Wang | G06N 3/063 |
| 2021/0373886 | A1* | 12/2021 | Nealis | G06F 5/015 |
| 2022/0083865 | A1* | 3/2022 | Riazi | G06F 21/71 |
| 2022/0129729 | A1* | 4/2022 | Matsumoto | G06F 7/5443 |

FOREIGN PATENT DOCUMENTS

| | | | | |
|---|---|---|---|---|
| CN | 106779057 | A * | 5/2017 | G06F 9/30018 |
| CN | 106875011 | A * | 6/2017 | G06N 3/063 |
| CN | 107169563 | A | 9/2017 | |
| CN | 107491787 | A * | 12/2017 | G06K 9/46 |
| CN | 108009518 | A * | 5/2018 | G06K 9/00818 |
| CN | 108549854 | B * | 4/2019 | G06K 9/00281 |
| CN | 109993279 | A | 7/2019 | |
| CN | 110033085 | A * | 7/2019 | G06N 3/0454 |
| CN | 110033086 | A * | 7/2019 | G06N 3/0454 |
| CN | 110046705 | A * | 7/2019 | G06N 3/0454 |
| CN | 110135563 | A | 8/2019 | |
| CN | 110245741 | A * | 9/2019 | G06N 3/04 |
| CN | 110298163 | A * | 10/2019 | G06F 21/36 |
| CN | 110738241 | A * | 1/2020 | |
| CN | 110837887 | A * | 2/2020 | G06N 3/0454 |
| CN | 106875011 | B * | 4/2020 | G06N 3/063 |
| CN | 111372755 | A * | 7/2020 | B22F 10/20 |
| CN | 110059805 | B * | 8/2021 | G06N 3/0454 |
| CN | 110097177 | B * | 11/2022 | G06N 3/0454 |
| EP | 3543917 | A1 * | 9/2019 | G06N 3/04 |
| JP | 2005-142949 | A | 6/2005 | |
| JP | 2021015510 | A * | 2/2021 | G06F 17/16 |
| JP | 7265946 | B2 * | 4/2023 | G06F 17/16 |
| KR | 20200121497 | A * | 10/2020 | G06N 3/063 |
| WO | WO 2018/207458 | A1 | 11/2018 | |
| WO | WO-2020026475 | A1 * | 2/2020 | |

OTHER PUBLICATIONS

Kim, Minje et al., "Bitwise Neural Networks." Department of Computer Science, University of Illinois at Urbana-Champaign, Jan. 22, 2016.

Courbariaux, Matthieu, et al., "Binarized Neural Networks: Training Neural Networks with Weights and Activations Constrained to +1 or −1", In NIPS, Mar. 17, 2016.

Rastegari, Mohammad, et al., "XNOR-Net: ImageNet Classification Using Binary Convolutional Neural Networks", In ECCV, Aug. 2, 2016.

Deng, Lei, et al., "GXNOR-Net: Training deep neural networks with ternary weights and activations without full-precision memory under a unified discretization framework", Neural Networks 100, May 2, 2018.

Alemdar, Hande, et al., "Ternary Neural Networks for Resource-Efficient AI Applications", 2017 International Joint Conference on Neural Networks (IJCNN), IEEE, Feb. 26, 2017.

Wan, Diwen, et al., "TBN: Convolutional Neural Network with Ternary Inputs and Binary Weights", Proceedings of the European Conference on Computer Vision (ECCV), 2018.

Zhou, Shuchang, et al., "DoReFa-Net: Training Low Bitwidth Convolutional Neural Networks with Low Bitwidth Gradients", arXiv:1606.06160v3, Feb. 2, 2018.

Liang, Shuang, et al., "FP-BNN: Binarized neural network on FPGA", Neurocomputing, 2017.

Ando, Kota, et al., "BRein Memory: A Single-Chip Binary/Ternary Reconfigurable in-Memory Deep Neural Network Accelerator Achieving 1.4 Tops at 0.6 W", IEEE Journal of Solid-State Circuits, vol. 53, No. 4, Apr. 2018.

Lee, Jinmook, et al., "UNPU: An Energy-Efficient Deep Neural Network Accelerator With Fully Variable Weight Bit Precision", IEEE Journal of Solid-State Circuits, vol. 54, No. 1, Jan. 2019.

Jafari, Ali, et al., "BINMAC: Binarized Neural Network Manycore Accelerator", Proceedings of the 2018 on Great Lakes Symposium on VLSI, ACM, 2018.

Conti, Francesco, et al., "XNOR Neural Engine: a Hardware Accelerator IP for 21.6 fJ/op Binary Neural Network Inference", IEEE Transactions on Computer-Aided Design of Integrated Circuits and Systems, Jul. 9, 2018.

Al Bahou, Andrawes, et al., "XNORBIN: A 95 TOp/s/W Hardware Accelerator for Binary Convolutional Neural Networks", 2018 IEEE Symposium in Low-Power and High-Speed Chips (Cool Chips), IEEE, Mar. 5, 2018.

Jiang, Lei, et al., "XNOR-POP: A Processing-in-Memory Architecture for Binary Convolutional Neural Networks in Wide-IO2 DRAMs", 2017 IEEE/ACM International Symposium on Low Power Electronics and Design (ISLPED), IEEE, 2017.

Choi, Woong, et al., "Content Addressable Memory Based Binarized Neural Network Accelerator Using Time-Domain Signal Processing", Proceedings of the 55the Annual Design Automation Conference, ACM, 2018.

* cited by examiner

FIG. 1 (PRIOR ART)

| W vector | 1 | 1 | 1 | 0 | 1 | 1 | 0 | 0 |

| IFM vector | 0 | 1 | 1 | 0 | 0 | 1 | 1 | 0 |

| W AND IFM | 0 | 1 | 1 | 0 | 0 | 1 | 0 | 0 |

FIG. 2A (PRIOR ART)

| W vector | 1 | −1 | −1 | −1 | 1 | 1 | −1 | −1 |

| IFM vector | −1 | −1 | 1 | −1 | −1 | −1 | 1 | −1 |

| W X IFM | −1 | 1 | −1 | 1 | −1 | −1 | −1 | 1 |

FIG. 2B (PRIOR ART)

| W vector | 1 | 0 | 0 | 0 | 1 | 1 | 0 | 0 |
|---|---|---|---|---|---|---|---|---|

| IFM vector | 0 | 0 | 1 | 0 | 0 | 0 | 1 | 0 |
|---|---|---|---|---|---|---|---|---|

| W XNOR IFM | 0 | 1 | 0 | 1 | 0 | 0 | 0 | 1 |
|---|---|---|---|---|---|---|---|---|

FIG. 5A

| W | 1 | -1 | -1 | -1 | 1 | 0 | -1 | -1 |

| IFM | -1 | 0 | 1 | -1 | -1 | 0 | 1 | -1 |

| W X IFM | -1 | 0 | -1 | 1 | -1 | 0 | -1 | 1 |

ELECTRONIC DEVICE AND METHOD FOR INFERENCE BINARY AND TERNARY NEURAL NETWORKS

CROSS-REFERENCE TO RELATED APPLICATION

This application is based on and claims priority under 35 U.S.C. § 119 to Indian Patent Application No. 201941046680 filed on Nov. 15, 2019 and Oct. 22, 2020 in the Indian Patent Office, Designs & Trade Marks, and to Korean Patent Application No. 10-2020-0148127 filed on Nov. 6, 2020, in the Korean Intellectual Property Office, the entire disclosures of which are incorporated by reference herein for all purposes.

BACKGROUND

1. Field

The following description relates to electronic devices, and more specifically to a method and an electronic device for inferencing a Binary Neural Network (BNN) and a Ternary Neural Network (TNN).

2. Description of Related Art

Convolutional Neural Network (CNN) is a class of deep neural networks, most commonly applied in domain of computer vision. However, a high accuracy in computing at traditional Central Processing Unit/Graphics Processing Unit (CPU/GPU) based systems using the CNN achieves at a cost of significant energy consumption and overheads. Model quantization technique is used in order to alleviate issues due to CNN based computing. Binary Neural Network BNN and Ternary Neural Network (TNN) are some of extreme quantization techniques, where model data (i.e. parameter, activation, etc.) can be represented as one and two bits respectively. Various BNN and TNN models (i.e. Data types) and operands using for each model are given in Table-1.

| Data types | Operand 1 | Operand 2 |
|---|---|---|
| BNN_A | {0, 1} | {0, 1} |
| BNN_B | {−1, +1} | {−1, +1} |
| TNN | {−1, 0, +1} | {−1, 0, +1} |
| TNN_BNN_A | {−1, 0, +1} | {0, 1} |
| TNN_BNN_B | {−1, 0, +1} | {−1, +1} |

Table-1: Various BNN and TNN Models and Operands

Conventionally, a hardware accelerator in an electronic device is capable of processing a particular data type. But, the hardware accelerator is not capable of processing all data types. Therefore, multiple hardware accelerators are required in the electronic device for processing multiple data types. More area is required to implement the multiple hardware accelerators in an electronic chip of the electronic device, which undesirably increases overall size of the electronic device. Further, a large number of components are required to implement the multiple hardware accelerators in the electronic device, which undesirably increases a manufacturing cost of the electronic device. Further, an overall power consumption of the electronic device is higher due to consuming power for operating the multiple hardware accelerators in the electronic device. Thus, it is desired to address the above-mentioned shortcomings or at least provide a useful alternative.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method and an electronic device for computing an inner product on a binary data, a ternary data, a non-binary data, and a non-ternary data.

In one general aspect, a method for computing an inner product on a binary data, a ternary data, a non-binary data, and a non-ternary data includes calculating, by an electronic device, the inner product on the ternary data, designing, by the electronic device, a fused bitwise data path to support the inner product calculation on the binary data and the ternary data, designing, by the electronic device, a Full Precision Layer (FPL) data path to calculate an inner product between one of the non-binary data and the non-ternary data and one of the binary data and the ternary data, and distributing, by the electronic device, the inner product calculation for the binary data and the ternary data and the inner product between one of the non-binary data and the non-ternary data and one of the binary data and the ternary data in the fused data path and the FPL data path.

Processing the fused data path to support the inner product calculation for the binary data and the ternary data includes receiving, by the electronic device, one of the ternary data and the binary data, determining, by the electronic device, a mode of operation for the ternary data and the binary data, processing, by the electronic device, at least one of the ternary data and the binary data in a XNOR gate and a AND gate using at least one popcount logic based on the determined mode of the operation, receiving, by the electronic device, at least one of the processed ternary data and the processed binary data to an accumulator, and generating, by the electronic device, at least one of a final ternary value and a final binary value.

Processing, by the electronic device, at least one of the ternary data and the binary data in the XNOR gate and the AND gate using the at least one popcount based on the determined mode of the operation, when a fused data path engine of the electronic device is configured to support the binary data used by a Binary Neural Network (BNN) model and the ternary data used by a Ternary Neural Network (TNN) model, receiving one bit of a first vector and one bit of a second vector, using the first XNOR gate, to generate a product vector of length N bits as an output of the first XNOR gate, receiving the one bit of the first vector and the one bit of the second vector, using the first AND gate, to generate a product vector of length N bits as an output of the first AND gate, receiving one bit of a third vector and one bit of a fourth vector, using the second XNOR gate, to generate a product vector of length N bits as an output of the second XNOR gate, receiving the one bit of the third vector and the one bit of the fourth vector, using the second AND gate, to generate a product vector of length N bits as an output of the second AND gate, feeding the output of the first XNOR gate and the output of the first AND gate as the input of the first multiplexer, where the output of the first multiplexer includes of a mask vector of a resultant inner product between two ternary vectors in case of the ternary data or the resultant inner product vector of a first binary vector pair in case of the binary data, feeding the output of the first AND gate and the output of the second XNOR gate as an input of the third AND gate, receiving an input from the output of the second XNOR gate, the output of the second AND gate, and an output of the third AND gate using a second multiplexer, where an output of the second multiplexer includes a value vector of the resultant inner product of the two ternary vector pairs which is only affected by non-zero element pairs from the value vector of the input ternary vector pairs in case of the ternary data, where the output of second multiplexer includes a resultant inner product vector of a second binary vector pair in case of the binary data, receiving a first bit length and the input from the first multiplexer through the first pop-counter, where the output of the first multiplexer feeds as an input of the first pop-counter, where the first pop-counter computes the number of 1s in the resultant mask vector in case of the ternary data and the number of 1s in the resultant inner product vector in case of the binary data which is forwarded to the third multiplexer, in case of the binary data and forwarded to the fourth multiplexer, in case of the ternary data, and receiving the second bit length, the output from the first multiplexer and the second pop-counter to the fourth multiplexer, where the second pop-counter computes a number of one value from the output of the second multiplexer that is forwarded to the fourth multiplexer, where an output of the second pop-counter is left shifted by one value, where the output of fourth multiplexer includes of either the output from the first pop-counter in case of the ternary data or the second bit length in case of the binary data type B or the output from the second pop-counter in case of the binary data type A, where the left shifted output of the first pop-counter and the output of the third multiplexer are subtracted in a first subtractor, where the output of the first subtractor denotes the inner product value of the two binary vector pair, where the left shifted output of the second pop-counter and the output of the fourth multiplexer are subtracted in a second subtractor, where the output of the second subtractor indicates the inner product value between two ternary vector pair, in case of the ternary data or the inner product value between the second binary vector pair in case of the binary data, where the output of the second subtractor and an output of the first subtractor are added in a first adder in case of the binary data, where the output of a fifth multiplexer selects either the output from the first adder in case of the binary data, or the output from the second subtractor in case of the ternary data, where the output of the fifth multiplexer is added with a first accumulator using a second adder, and where an output of the second adder is stored in the first accumulator, where the output of the second adder is compared with a threshold in a comparator to generate an output value.

Processing, by the electronic device, at least one of the ternary data and the binary data in the XNOR gate and the AND using the at least one popcount logic based on the determined mode of the operation, when a fused data path engine of the electronic device is configured to support the ternary data used by the TNN model, receiving one bit of a first vector and one bit of a second vector, using the first AND gate, to generate a product vector of length N bits as an output of the first AND gate, receiving one bit of a third vector and one bit of a fourth vector using the second XNOR gate to generate a product vector of length N bits as an output of the second XNOR gate, feeding the output of the first AND gate as an input of the first multiplexer, feeding the output of the first AND gate and the output of the second XNOR gate as an input of the third AND gate, receiving the input from the output of the second XNOR gate, and an output of the third AND gate using the second multiplexer, where an output of the second multiplexer includes elements in a resultant bit vector obtained from bitwise operation between two ternary vectors, and receiving a second bit length and an input from the second multiplexer through the second pop-counter and the input from the first multiplexer through the first pop-counter using the fourth multiplexer, where the second pop-counter computes a number of one value from the output of the second multiplexer that is forwarded to the fourth multiplexer, where an output of the second pop-counter is left shifted by one value, where the first pop-counter computes the number of ones in the bit vector obtained after bitwise AND operation between mask vectors of the two ternary data that is forwarded to the fourth multiplexer, where a first bit vector and a second bit vector are the mask vectors, where a value of number of ones denote a number of non-zero values obtained after the dot-product operation between the two ternary vectors, where the left shifted output of the second pop-counter and the output of the fourth multiplexer are subtracted in a second subtractor to remove an impact of zero element in an output of the second subtractor, where the output of the second subtractor is a result of dot product operation performed on the two ternary vectors, where the output of the second subtractor is provided with a first accumulator to perform an accumulation operation using a fifth multiplexer and a second adder, and where an output of the second adder is stored in the first accumulator, where the output of the second adder is compared with a threshold in a comparator to generate an output value.

Processing, by the electronic device, at least one of the ternary data and the binary data in the XNOR gate and the AND gate using the at least one popcount logic based on the determined mode of the operation, when a fused data path engine of the electronic device is configured to support the binary data used by the BNN model, receiving one bit of a first vector and one bit of a second vector using the first XNOR gate, to generate a product vector of length N bits as an output of the first XNOR gate, receiving one bit of a third vector and one bit of a fourth vector, using the second XNOR gate, to generate a product vector of length N bits as an output of the second XNOR gate, feeding the output of the first XNOR gate as an input of the first multiplexer, feeding the output of the second XNOR gate as an input of the second multiplexer, where an output of the second multiplexer includes a resultant bit-vector obtained after a bitwise XNOR operation between the third bit vector and the fourth bit vector, receiving a first bit length and the input from the first multiplexer through the first pop-counter using the third multiplexer, where an output of the first multiplexer feeds as an input of the first pop-counter, where the first pop-counter computes a number of one value obtained in the bit vector from the output of the first multiplexer that is forwarded to the third multiplexer and the fourth multiplexer, and receiving a second bit length and the input from the first multiplexer through the first pop-counter and the input from the second multiplexer through the second pop-counter, where the second pop-counter computes a number of one value from the output of the second multiplexer that is forwarded to the fourth multiplexer, where an output of the second pop-counter is left shifted by one value, where the left shifted output of the first pop-counter and the output of the third multiplexer are subtracted in a first subtractor, where an output of the first subtractor indicates the dot-product between the first bit vector and the second bit vector, where the left shifted output of the second pop-counter and the output of the fourth multiplexer are subtracted in a second subtractor, where the output of the second subtractor indicates the dot-product between the third bit vector and the fourth bit vector, where the output of the second subtractor and the output of the first subtractor are added in the first adder with a first accumulator to perform an accumulation operation using the fifth multiplexer and the second adder, and where an output of the second adder is stored in the first accumulator, where the output of the second adder is compared with a threshold in a comparator to generate an output value.

The dot product performs computation for Multiply and Accumulate (MAC) operation in the BNN model and the TNN model.

The FPL data path performs dot product between a full precision Input Feature Map (IFM) data and one of a binary kernel data and a ternary kernel data.

An output of one of the FPL data path and the fused data path is selected for accumulation based on a layer type, where the layer type is a full precision layer or a hidden layer.

The fused data path performs a dot product between a Kernel data and an IFM data where the Kernel data and the IFM data are represented in the binary data or the ternary data.

Distributing, by the electronic device, the inner product calculation for the binary data and the ternary data and the inner product between one of the non-binary data and the non-ternary data and one of the binary data and the ternary data in the fused data path and the FPL data path, includes designing, by the electronic device, combine the bitwise data path and the FPL data path to form a Processing Element (PE), where the PE computes the inner product between a pair of binary or ternary data inside the bitwise data path, or the inner product between one full precision data and one binary or ternary data inside the FPL data path, and distributing, by the electronic device, required data for multiple PEs of a two-dimensional PE array, using a dispatcher to support both the bitwise data path and the FPL data path without an additional storage overhead.

In another general aspect, an electronic device for computing the inner product on the binary data, the ternary data, the non-binary data, and the non-ternary data includes a Static Random-Access Memory (SRAM), at least one controller configured to send address to the SRAM, a Processing Engine (PE) array, and a dispatcher configured to receive at least one SRAM data and forward the at least one SRAM data to the PE array. The PE array includes a PE array controller, an Output Feature Map (OFM) combiner and a plurality of fused data path engine, where each fused data path engine includes the FPL data path and the bitwise data path. The fused data path engine is configured to provide a fused data path for a Binary Neural Network (BNN) model and a Ternary Neural Network (TNN) model.

Other features and aspects will be apparent from the following detailed description, the drawings, and the claims.

BRIEF DESCRIPTION OF THE DRAWINGS

FIG. 1 illustrates an example scenario of determining a dot product on a BNN_A data type, according to the related art.

FIG. 2A illustrates an example scenario of determining the dot product on a BNN_B data type based on a representation of an arithmetic computation, according to the related art.

FIG. 2B illustrates an example scenario of determining the dot product on the BNN_B data type based on a bitwise implementation, according to the related art.

FIG. 5A illustrates an example scenario of determining the dot product on a TNN data type based on the representation of the arithmetic computation, according to an example as disclosed herein.

Figure 3A:
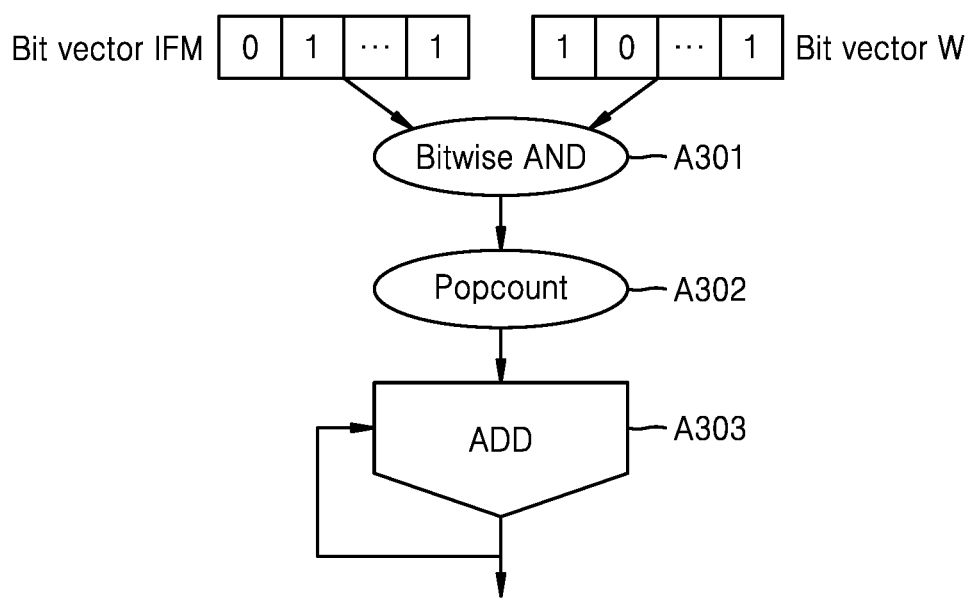
FIG. 3A is a flow diagram illustrating a method for performing a MAC operation on a binary data belongs to the BNN_A data type, according to the related art.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

As is traditional in the field, examples may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the examples may be physically separated into two or more interacting and discrete blocks without departing from the scope of the disclosure. Likewise, the blocks of the examples may be physically combined into more complex blocks without departing from the scope of the disclosure.

Dot product (also called as inner product) is a computation for a Multiply and Accumulate (MAC) operation in neural networks. A number of expensive hardware multiplier logic is needed for performing the MAC operation on higher precision data. However, a cheaper hardware bitwise logic is sufficient for performing the MAC operation on extreme lower precision data such as a binary data, a ternary data, etc. The inner product of a pair of vectors is calculated as element wise multiplication followed by summing all multiplication results, i.e. sum($A_i \times B_i$), where A and B are the pair of data vectors of a length L. $A_i$, $B_i$ represent ith element of A and B vector respectively. In an example, elements of A and B can be any real or complex number. A binary data can be of two types BNN_A ($\{0,1\}$) and BNN_B ($\{-1, +1\}$). Both binary datatypes can be represented using one bit. In case of BNN_B, 0 represents −1 and 1 represents +1. The methodology explained in a context of neural networks for further clarity in subsequent sections. Two input vectors are used in this disclosure, which are an Input Feature Map (IFM) vector and weight or kernel (W) vector, for the inner product operation. The terms "data", "data vector", "IFM vector", "Bit vector" and "IFM data" are interchangeably used in this disclosure and have same meaning.

FIG. 1 illustrates an example scenario of determining the dot product on a BNN_A data type. As per a definition of the inner product, a final result is obtained by elementwise multiplication between the W and the IFM vector. Multiplication hardware has higher area and power overhead. "W AND IFM" vector shows element wise multiplication between W and IFM vectors. Hence, instead of using multiplication hardware, element wise AND (bitwise AND)

operation on W and IFM vector (shown in "W AND IFM" vector) is used. The final result is obtained by counting number of 1's in "W AND IFM" vector. In this example, the result of inner product between W and IFM vector is 3 as given below.

$$\text{Dot product between } W \text{ and } IFM = \#1 \text{ in } W \text{ AND } IFM \text{ bit vector}$$
$$= \text{popcount } (\#1 \text{ in bit vector})$$
$$= 3$$

FIG. 2A illustrates an example scenario of determining the dot product on a BNN_B data type based on a representation of an arithmetic computation. The W and IFM vectors are shown for the BNN_B datatype. "W×IFM" vector shows element wise multiplication between W and IFM vector. The final result of inner product is determined by subtracting B from A, where A is the number of "1"s and B is the number of "−1"s, in "W×IFM" vector. In this example, the final result is −2. Number of 1 in "W×IFM" is represented as #1 and number of −1 in "W×IFM" is represented as #−1.

$$\text{Dot product between } W \text{ and } IFM = \#1 + (\#-1)^* - 1$$
$$= 3 - 5$$
$$= -2$$

FIG. 2B illustrates an example scenario of determining the dot product on the BNN_B data type based on the bitwise implementation, which shows the same final result (i.e. −2) while using multipliers. The W and IFM vectors are represented in 1 bit. The inner product operation in the bitwise manner is performed as in steps (a-c).
a) Perform bitwise XNOR operation (shown in "W XNOR IFM").
b) Count number of 1's in "W XNOR IFM" vector. Counting one operation in a bit vector is also known as POPCOUNT, let this value is v.
c) If the bit vector length of W and IFM are L. Then inner product result is determined as (2×v)−L, which can also be expressed as (v«1)−L, where "«" represent bitwise left shift.

In this example, step c shows result as −2, since v turns out to be 3 and L is 8 in this case. Thus, the inner product is calculated in bitwise manner is equivalent to the operation described in the definition of "inner product". The above steps (a-c) are also shown in the form of a flow chart in FIG. 3B. After the result obtained as output of B304 in the FIG. 3B, the value is further added in B305 with accumulator contents. This addition operation is known as accumulation in MAC operation.

$$\text{Dot product between } W \text{ and } IFM = \#1 + (\#0)^* - 1$$
$$= \#1 - \#0$$
$$= \#1 - (\text{BIT\_VECTOR\_LENGTH} - \#1)$$
$$= 2^*(\#1) - \text{BIT\_VECTOR\_LENGTH}$$
$$= (\text{popcount} << 1) - \text{BIT\_VECTOR\_LENGTH}$$
$$= (3 << 1) - 8$$
$$= -2$$

FIG. 3A is a flow diagram illustrating a method for performing a MAC operation on the binary data belongs to the BNN_A data type. At step A301, the method includes performing bitwise AND operation between the W vector and the IFM vector. At step A302, the method includes detecting the popcount in response to performing bitwise AND operation to each pair of bits and determining a value of dot product between the IFM and W vectors. At step A303, the method includes adding the popcount for the accumulation operation, where the MAC operation completes after the step A303.

Figure 3B:
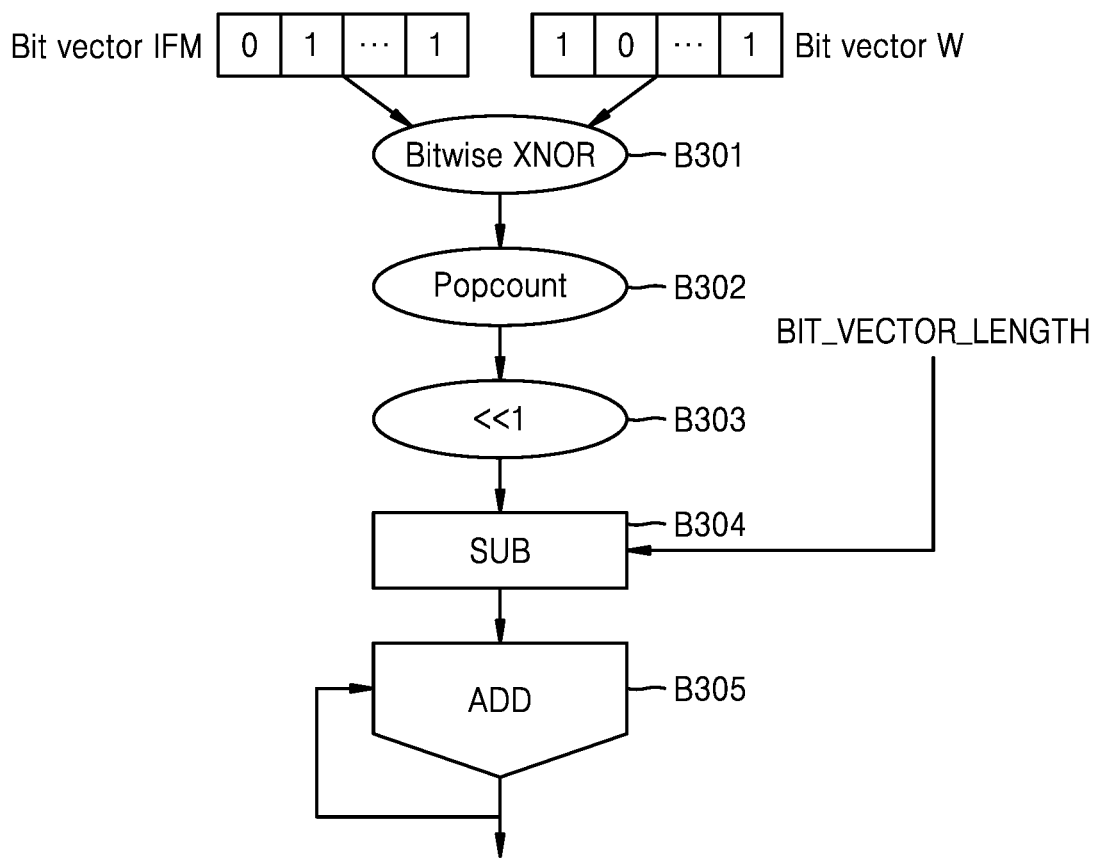
FIG. 3B is a flow diagram illustrating a method for performing the MAC operation on the binary data belongs to the BNN_B data type, according to the related art.

FIG. 3B is a flow diagram illustrating a method for performing the MAC operation on the binary data belongs to the BNN_B data type. At step B301, the method includes performing bitwise XNOR operation between the W vector and the IFM vector. At step B302, the method includes detecting the popcount in response to performing bitwise XNOR operation to each pair of bits. At step B303, the method includes performing a left shift to the popcount. At step B304, the method includes subtracting the length of the IFM vector or the W vector from the left shifted popcount and determining a value of the dot product between the IFM and W vectors. At step B305, the method includes adding the popcount for the accumulation operation, where the MAC operation completes after the step B305.

Figure 4:
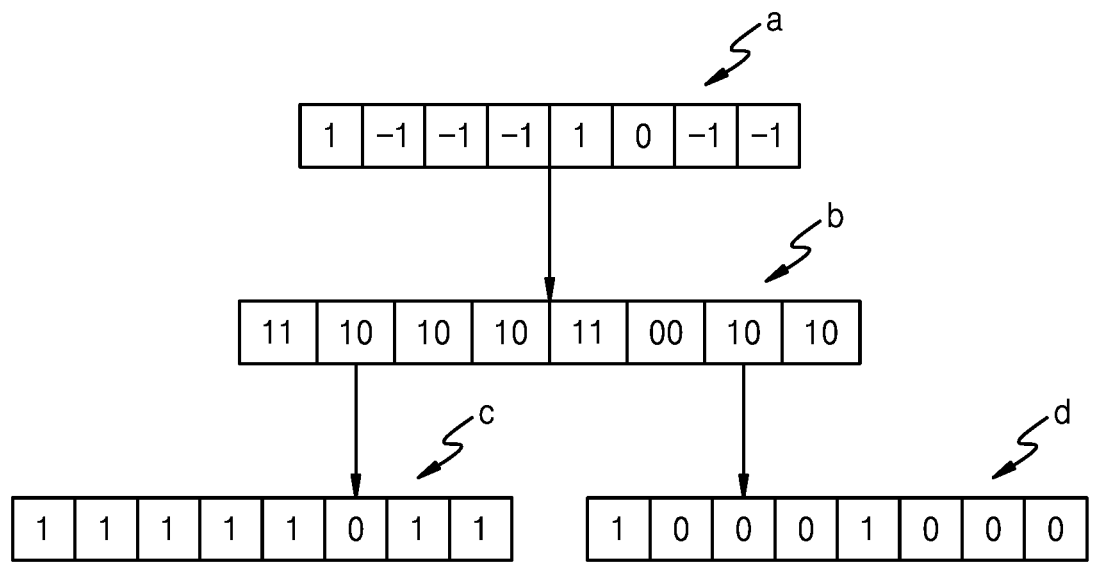
FIG. 4 illustrates an example scenario of modifying a signed representation of a ternary data to two-bit representation, according to the related art.

FIG. 4 illustrates an example scenario of modifying a signed representation of the ternary data to two-bit representation. The vector of the ternary data is shown in a notation (a) of the FIG. 4. Each ternary data is represented in 2 bits, 1 bit for mask and 1 for value using Table-2. The mask bit represents whether the ternary data is zero or not. The value bit represents 0 for ternary data less than equal to zero, 1 otherwise.

| Data | Mask (m) | Value (v) | 2 bit representation msb: m lsb: v |
|---|---|---|---|
| 0 | 0 | 0 | 00 |
| −1 | 1 | 0 | 10 |
| +1 | 1 | 1 | 11 |

Figure 7A:
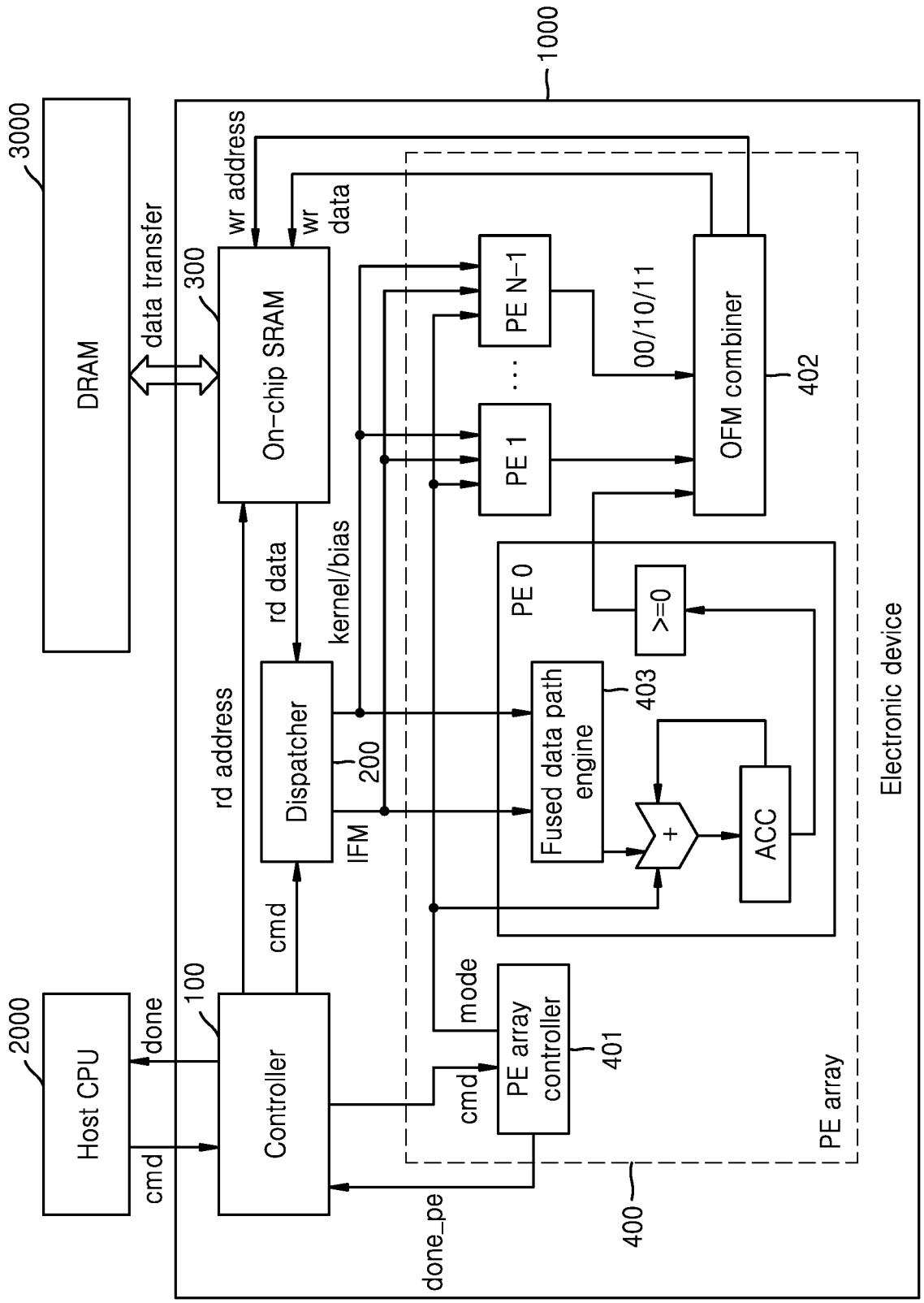
FIG. 7A illustrates an overview of the electronic device for computing an inner product on the binary data, the ternary data, a non-binary data, and a non-ternary data, according to an example as disclosed herein.

The examples herein provide a method for computing an inner product on a binary data, a ternary data, a non-binary data, and a non-ternary data using an electronic device (1000 in FIG. 7A, for example). The method includes designing to calculate the inner product on a ternary data. The method includes designing a fused bitwise data path to support the inner product calculation on the binary data and the ternary data. The method includes designing a FPL data path to calculate an inner product between one of the non-binary data and the non-ternary data and one of the binary data and the ternary data. The method includes distributing the inner product calculation for the binary data and the ternary data and the inner product between one of the non-binary data and the non-ternary data and one of the binary data and the ternary data in the fused bitwise data path and the FPL data path. The examples herein provide a method for computing an inner product on a binary data, a ternary data, a non-binary data, and a non-ternary data using an electronic device (1000). The method includes designing to calculate the inner product on a ternary data. The method includes designing a fused bitwise data path to support the inner product calculation on the binary data and the ternary data. The method includes designing a FPL data path to calculate an inner product between one of the non-binary data and the non-ternary data and one of the binary data and the ternary data. The method includes distributing the inner product calculation for the binary data and the ternary data and the inner product between one of the non-binary data and the non-ternary data and one of the binary data and the ternary data in the fused bitwise data path and the FPL data path. The examples herein provide a method for computing an inner product on a binary data, a ternary data, a non-binary data, and a non-ternary data using an electronic device (1000). The method includes designing to calculate the inner product on a ternary data. The method includes designing a fused bitwise data path to support the inner product calculation on the binary data and the ternary data. The method includes designing a FPL data path to calculate an inner product between one of the non-binary data and the non-ternary data and one of the binary data and the ternary data. The method includes distributing the inner product calculation for the binary data and the ternary data and the inner product between one of the non-binary data and the non-ternary data and one of the binary data and the ternary data in the fused bitwise data path and the FPL data path.is represented as #−1.

$$\text{Dot product between } W \text{ and } IFM = \#1 + (\#-1)^* - 1$$
$$= 2 - 4$$
$$= -2$$

Figure 5A:
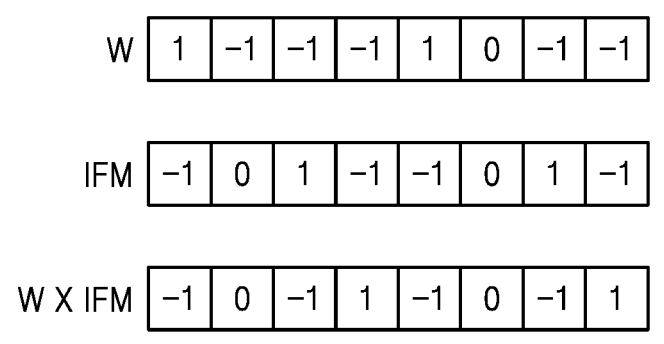
Figure 5B:
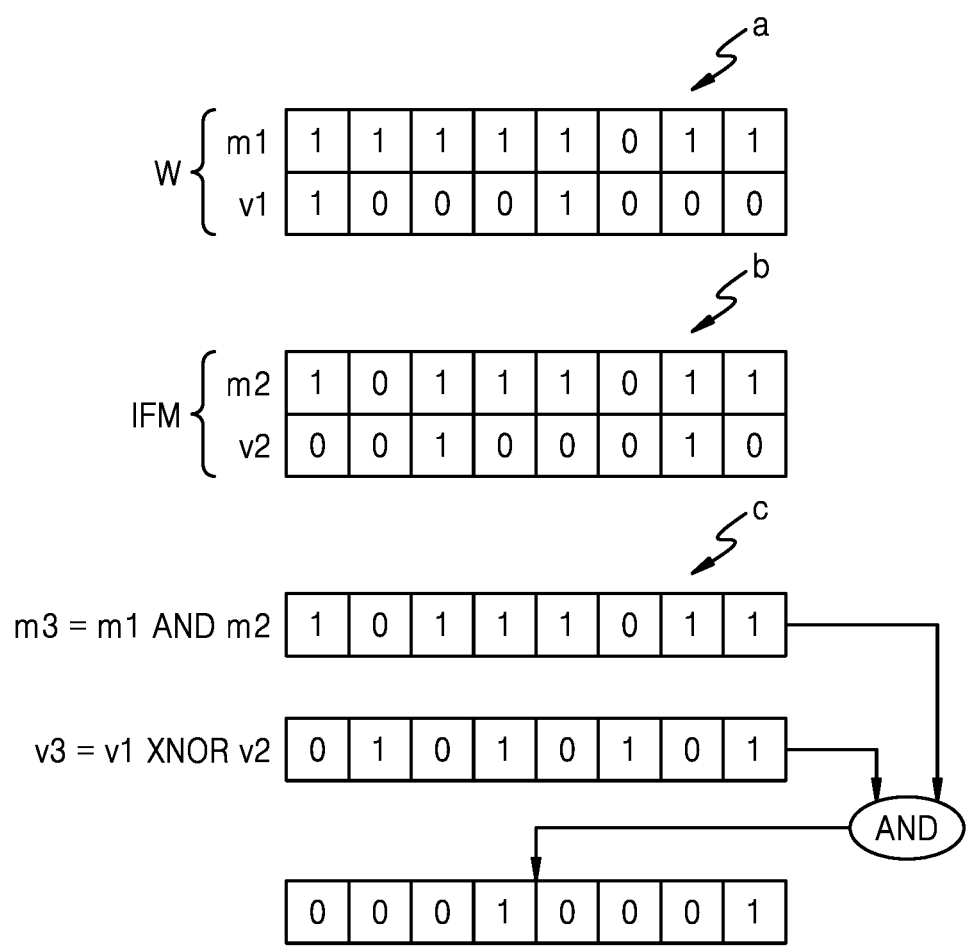
FIG. 5B illustrates an example scenario of determining the dot product on the TNN data type based on the bitwise implementation, according to an example as disclosed herein.

FIG. 5B illustrates an example scenario of determining the dot product on the TNN data type based on the bitwise implementation, according to an example as disclosed herein. Also, an example for the inner product operation on ternary data in the FIG. 5B.

As per the Table-2, the W vector and the IFM vector modifies to the two-bit data representation. The mask (m1) and value (v1) vector for W is shown in the notation (a) of the FIG. 5B. The mask (m2) and value (v2) vector for the IFM is shown in the notation (b) of the FIG. 5B. Further, the bitwise AND operation between the m1 vector and the m2 vector performs to form an m3 vector. Further, the bitwise XNOR operation between the v1 vector and the v2 vector performs to form a v3 vector. Further, the bitwise AND operation performs using the m3 vector and the v3 vector to determine the dot product. The popcount is the number of 1 bit in a vector. This shows that a final result obtained in the bitwise method is same as the multiplication method explained in the FIG. 5A.

$$\text{Dot product between } W \text{ and } IFM = (2*\text{popcount in } m3 \text{ AND } v3) -$$
$$= \text{popcount in } m3$$
$$= (\text{popcount in } m3 \text{ AND } v3 \ll 1) -$$
$$\text{popcount in } m3$$
$$= 4 - 6$$
$$= -2$$

Figure 6:
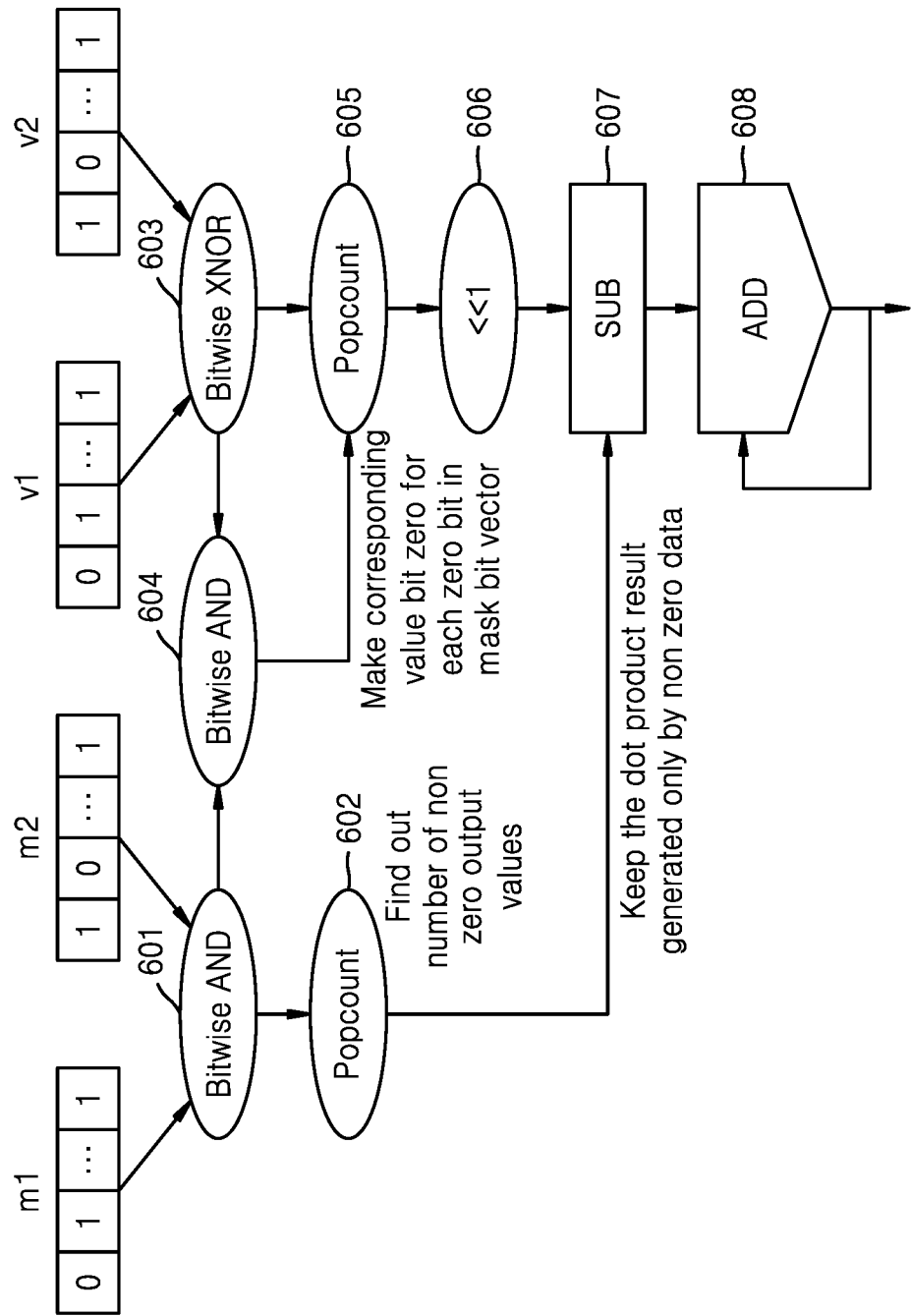
FIG. 6 is a flow diagram illustrating a method for performing the MAC operation on the ternary data belongs to the TNN data type, according to an example as disclosed herein.

FIG. 6 is a flow diagram illustrating a method for performing the MAC operation on the ternary data belongs to the TNN data type, according to an example as disclosed herein. At step 601, the method includes performing bitwise AND operation between m1 and m2. At step 602, the output from the step 601 is used to determine which of the ternary data after elementwise operation are non-zero. At step 603, the method includes performing the bitwise XNOR operation between v1 and v2. The output from the step 603 is the result of element wise operation between value bit vectors. Now, like BNN_B datatype, if step a-c is followed, the result of inner product may be incorrect. This is because, in ternary representation, value bit being 0 represents both equal to 0 and less than 0. Consider a scenario, where two ternary data, d_a=00 and d_b=00 are used for inner product. In that case, bitwise XNOR of d_a,d_b's value bits generate 1. Considering that value, the final inner product will be incorrect, i.e. 1 instead of 0. Hence, further need to perform an additional AND operation with mask, to ensure we consider only non-zero values. Hence, at step 604, the method includes performing a bitwise AND operation between the output from steps 601 and 603. The output from step 604 keeps only non-zero values after bitwise operation between v1 and v2. Count number of 1's from the step 605, in the vector generated as an output from the step 604. Left shift the output from the step 605, equivalent to multiply by 2 operation. Now, if bit vector length of ternary data is subtracted from output of the step 606, result would be incorrect. This is because, the output of the step 604 may contain zero data. Hence, to keep the dot product result generated only by non-zero data, instead of vector length, count of non-zero values (which is output of the step 602), are subtracted at step 607 from the output of the step 606. Output of the step 607 determines the inner product of two ternary vectors. To perform accumulation operation, the inner product of the two ternary vectors is added further in step 608 with accumulator value.

Now the correctness of the example for inner product operation on ternary data is further shown. The final vector after m3 AND v3, has 2 "1"s. Number of "1"s in m3 is 6. So, (2«1) −6, results −2; which is same as the inner product output performed using element wise computation as shown in the FIG. 5A.

FIG. 7A illustrates an overview of an electronic device for computing an inner product on the binary data, the ternary data, a non-binary data, and a non-ternary data, according to an example as disclosed herein. Examples for the electronic device (1000) are, but not limited to a smart phone, a tablet computer, a personal computer, a desktop computer, a personal digital assistance (PDA), a multimedia device, an Internet of Things (IoT) or the like. In an example, the electronic device 1000 is a hardware accelerator to perform inferencing on an extreme low level quantized neural network, i.e. a BNN and a TNN. In an example, the electronic device (1000) is connected to a host Central Processing Unit (CPU) 2000 for receiving commands to perform a layer operation such as a convolution, pooling, fully connected etc. In an example, the electronic device 1000 is connected to a Dynamic Random-Access Memory (DRAM) 3000 for receiving and storing the data vectors.

In an example, the electronic device 1000 includes a controller 100, a dispatcher 200, a Static Random-Access Memory (SRAM) 300 (e.g. an on-chip SRAM), and a Processing Engine (PE) array 400. The controller 100 controls the PE array 400 and the dispatcher 200. The dispatcher 200 is coupled with the controller 100 and the on-chip SRAM 300. The controller 100 is configured to send address to the SRAM 300. The dispatcher 200 is configured to receive SRAM data and forward the SRAM data to the PE array 400. In an example, the dispatcher 200 is configured to forward data to either of the two data paths (i.e. Full Precision Layer (FPL) data path and fused bitwise (BW) data path) of each PE in the PE array 400. In an example, the FPL data path performs dot product between a full precision (non-ternary and non-binary) IFM data vector and one of a binary or a ternary kernel data vector. In an example, an output of one of the FPL data path and the fused bitwise data path is selected based on a type of one of a full precision layer and hidden layer for accumulation. In an example, the fused data path performs a dot product between a pair of vectors (i.e. the IFM and kernel) in case of the ternary data, and two pairs of vectors (i.e. IFM and kernel) in case of the binary data.

In an example, the PE array 400 includes a PE array controller (100), an Output Feature Map (OFM) combiner 402 and a plurality of fused data path engines 403. The fused data path engine 403 is configured to provide a fused data path for a BNN model and a TNN model, either in a full precision mode or a bitwise mode. In an example, the dot product performs computation for the MAC operation in the BNN model and the TNN model. In an example, the fused data path engine 403 is configured to support at least one of: the binary data used by the BNN model and the ternary data used by the TNN model. In an example, the fused data path engine 403 is configured to combine FPL data path and the fused bitwise data path into a single fused data path. In an example, the fused data path engine 403 is configured to process the ternary data in bitwise manner. In an example, the fused data path engine 403 is configured to combine data paths for the BNN model and the TNN model operating on data-types into the single fused data path. In an example, the BNN model is used to compute the inner product on a pair of binary data, and the TNN model is used to compute the inner product on the ternary data.

In another example, the PE array 400 includes a plurality of PEs (i.e. PE 0 to PE N−1), the PE array controller 401 and the OFM combiner 402, where each PE incudes the fused data path engine 403, an adder (represented as "+"), an accumulator (represented as ACC) and a comparator (represented as ">=0"). The fused data path engine 403 is provided with the fused data path by combining individual data paths for the BNN model and the TNN model. In an example, the PE array 400 performs the MAC operation on the data provided by the dispatcher 200. Each PE performs the MAC operation which is the core part of the neural network inference. This MAC operation comprises of two sub operations, i.e. multiply or inner dot product calculation and accumulation. The PE supports the inner dot product on a multitude of datatypes, i.e. 1-bit binary data used in the BNN, 2 bits ternary data used in the TNN. There is a common practice of keeping a first layer input data in the BNN, the TNN, in a higher precision (usually 8 bits); while weight (kernel) is maintained in a lower precision (i.e. 1 bit or 2bits). So, in order to support such a typical layer, the PE also supports inner dot product on the operand in the high precision and another operand in the lower precision (i.e. binary or ternary).

In an example, the PE array 400 is designed as a Single Instruction Multiple Data (SIMD) based two-dimensional array of PEs to share input data and increase a throughput of the electronic device 1000. The PE array 400 is responsible for performing multiple inner product calculations in parallel. In the context of neural networks, two inputs, i.e. IFM and kernels are used, in order to generate output, i.e. OFM. IFMs are shared across different columns of the PE array 400, whereas kernels are shared across different rows of the PE array (400). All input data are stored in staging registers of the PE array 400. The dispatcher 200 delivers input data from the staging registers to each PEs of the PE array 400 based on the mode (i.e. Data path selection, fused bitwise or FPL) selection, without any additional data storage overhead.

In an example, the host CPU 2000 provides required commands to the controller 100, where the controller 100 is responsible for communicating the electronic device 1000 with the host CPU 2000. In an example, the controller 100 handles loop traversal, in order to generate an OFM tensor. During the loop traversal, the controller 100 generates SRAM requests using two controllers (i.e. an IFM controller and a kernel controller) and sends an address of the data vectors to the SRAM 300. Further, the controller 100 sends a command to the dispatcher 200 to forward the data vectors from the SRAM 300 to the plurality of PEs. The dispatcher 200 forwards the data vectors received from the SRAM 300 to the PE array 400 based on the data path selection (i.e. FPL or fused bitwise) in order to perform the MAC operations by each PE. Further, the fused data path engine 403 in the PE receives the data vector from the dispatcher 200. The controller 100 provides a command to the PE array controller 401 to send a mode signal of the plurality of PEs. The PE array controller 401 sends the mode signal to the plurality of PEs for selecting a mode of operation (i.e. mode selection), in response to receiving the command from controller 100. In an example, the mode of operation is either a binary operation mode or a ternary operation mode. The fused data path engine 403 in the PE cause to perform the MAC operation on the data vectors based on the mode of operation for the inner product calculation.

In an example, the fused data path engine 403 receives one of the ternary data and the binary data for calculating the inner product for the binary data or the ternary data. Further, the fused data path engine 403 determines the mode of operation for the ternary data and the binary data. Further, the fused data path engine 403 process at least one of the ternary data and the binary data in a XNOR gate and a AND gate using at least one popcount logic based on the determined mode of the operation. Further, the fused data path engine 403 receives at least one of the processed ternary data and the processed binary data to an accumulator. The final result of MAC operations is stored in the accumulator. The value in the accumulator are further compared with a threshold value and convert the output value into a final ternary value or a final binary value. The PE provides a data output in a form 00 or 10 or 11 to the OFM combiner 402. Further, the OFM combiner 402 writes the data to the on-chip SRAM 300. The PE array controller 401 sends done_pe signal to the controller 100, in response to completing required MAC operations of a layer of the BNN or the TNN. Further, the controller 100 sends a done signal to the host CPU 2000 when all layer operations are completed.

Although FIG. 7A shows the hardware components of the electronic device 1000, the configuration is not limited thereto. In other examples, the electronic device 1000 may include less or more components. Further, the labels or names of the components are used only for illustrative purpose and does not limit the scope of the invention. One or more components can be combined together to perform same or substantially similar function for computing the inner product.

Figure 7B:
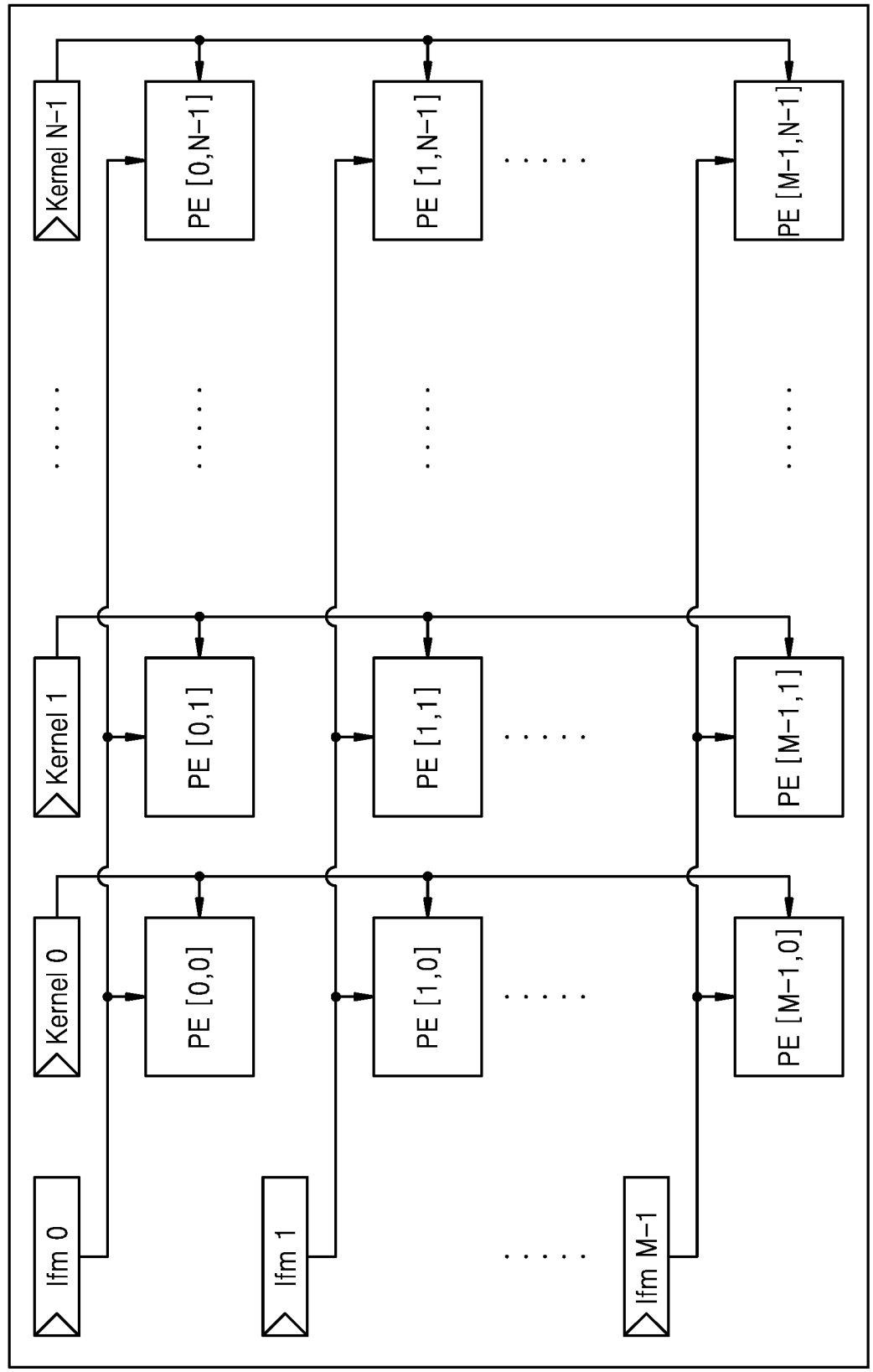
FIG. 7B illustrates an overview of a processing engine array of the electronic device, according to an example as disclosed herein.

FIG. 7B illustrates an overview of the PE array of the electronic device, according to an example as disclosed herein. The PE array 400 having M×N dimension is shown in FIG. 7B, where M number of PEs are present in each column of the PE array 400 and N number of PEs are present in each row of the PE array 400. In an example, a representation of PE (0, 5) indicates the PE in 0th raw and 5th column in the PE array 400. In another example, a representation of PE (3, 2) indicates the PE in 3rd raw and 2nd column in the PE array 400. At the left edge of the PE array 400, M number of registers are used to store different IFM data. At the top edge of the PE array 400, N number of registers are used to store different kernel data. To maximize data sharing to the PEs, the IFM vector is shared across the PEs in a row of the PE array 400 and the kernel vector is shared across the PEs in a column of the PE array 400. Each PE is cause to generate an OFM pixel. In an example, the PE array 400 performs a plurality of MAC operations on the data provided by the dispatcher 200 in parallel.

Figure 8:
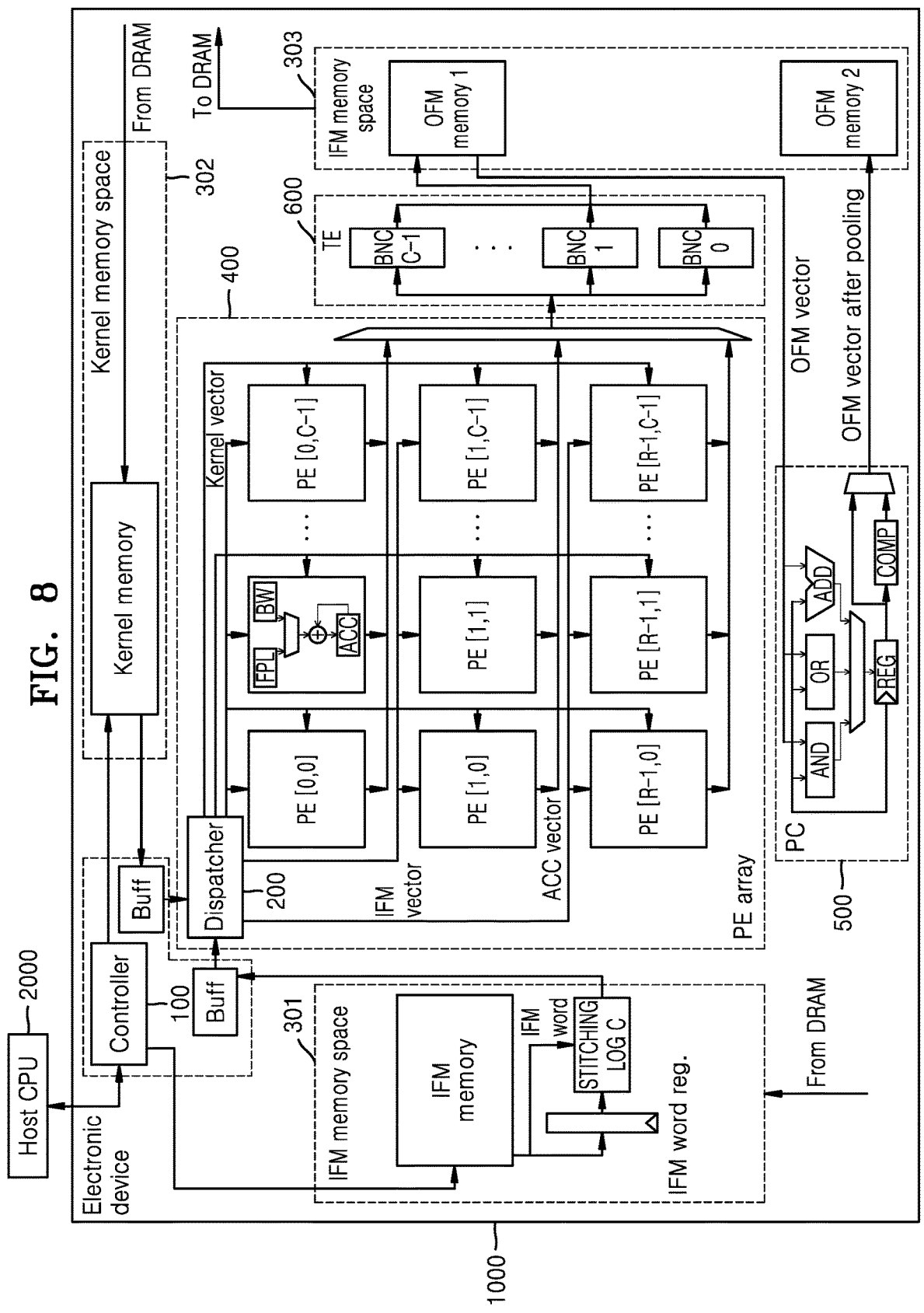
FIG. 8 is a block diagram of the electronic device for computing an inner product on the binary data, the ternary data, a non-binary data, and a non-ternary data, according to an example as disclosed herein.

FIG. 8 is a block diagram of the electronic device for computing the inner product on the binary data, the ternary data, the non-binary data, and the non-ternary data, according to an example as disclosed herein. In an example, the electronic device 1000 includes the controller 100, the dispatcher 200, the IFM memory space 301, the kernel memory space 302, the OFM memory space 303, the PE array 400, a Pooling Controller (PC) 500 and a Transform Engine (TE) 600. In an example, the on-chip SRAM 300 includes the IFM memory space 301, the kernel memory space 302, and the OFM memory space 303. The PE array 400 includes the plurality of PEs and the dispatcher 200, where each PE includes an FPL data path and the fused bitwise data path. The Host CPU 2000 is connected to the controller 100 of the electronic device 1000. Further, the DRAM 3000 is connected to the IFM memory space 301, the kernel memory space 302 and the OFM memory space 303 of the electronic device 1000.

The host CPU 2000 provides the required commands to perform the layer operation (e.g. convolution, pooling, fully connected etc.) to the controller 100. Further, the controller 100 establishes communication between other components. During the loop traversal, the controller 100 generates the SRAM requests using the two controllers (i.e. an IFM controller and a kernel controller). Further, the controller 100 forwards the data received from the kernel memory in the kernel memory space 302 and the IFM memory in the IFM memory space 301 to the dispatcher 200 using buffers (Buff). Further, the dispatcher 200 distributes the IFM data and the kernel data to the plurality of PE. In an example, the dispatcher 200 distributes the data to a number of staging registers at the left edge and the top edge of the PE array 400 to store the IFM and kernel data respectively. The dispatcher 200 distributes the IFM data which is shared across the PEs from different columns of a particular row. The dispatcher 200 distributes the kernel data which is shared across PEs from different rows of a particular column. Each PE performs the MAC operation on the data received from the dispatcher 200. Further, the PE array 400 sends its output (i.e. ACC vector) to TE 600 to perform operations such as batch normalization, comparison with threshold etc. Further, the TE 600 writes back the output to OFM memory 1 in the OFM memory space 303. The PC 500 reads the data (i.e. OFM vector) from the OFM memory 1 and performs the pooling operation. Further, the PC 500 writes a final data (i.e. OFM vector after pooling) to the OFM memory 2 in the OFM memory space 303. Further, the data from the OFM memory 1 and the OFM memory 2 are written back to the DRAM 3000. Further, the controller 100 sends the done signal to the host CPU 2000 when all the layer operations are completed.

Figure 9A:
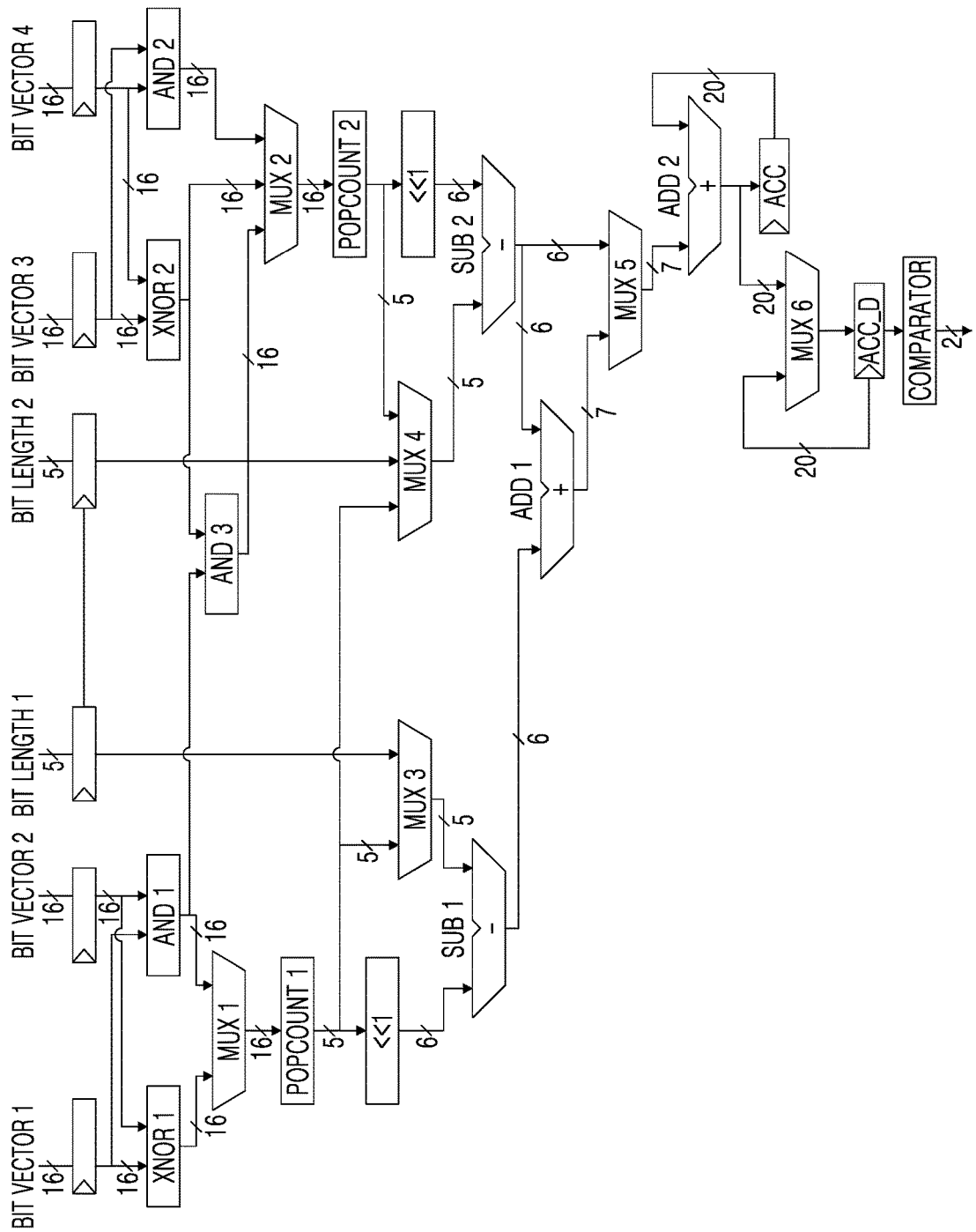
FIG. 9A is a block diagram of a fused data path engine for performing a Multiply and Accumulate (MAC) operation, according to an example as disclosed herein.

FIG. 9A is a block diagram of a fused data path engine for performing the MAC operation, according to an example as disclosed herein. In an example, the fused data path engine includes three AND gates (AND1-AND5), two exclusive NOR (XNOR) gates (XNOR1-XNOR2), six multiplexers (MUX1-MUX6), two subtractors (SUB1-SUB2), two pop-counters (POPCOUNT1-POPCOUNT2), two adders (ADD1-ADD2), two accumulators (ACC-ACC_D) and a comparator (COMPARATOR).

A first XNOR gate (XNOR1) receives one bit of a first vector (represented as BIT VECTOR 1) and one bit of a second vector (represented as BIT VECTOR 2) to generate a product vector of length N bits as an output of the first XNOR gate (XNOR1). A first AND gate (AND1) receives the one bit of the first vector and the one bit of the second vector to generate a product vector of length N bits as an output of the first AND gate (AND1). A second XNOR gate (XNOR2) receives one bit of a third vector (represented as BIT VECTOR 3) and one bit of a fourth vector (represented as BIT VECTOR 4) to generate a product vector of length N bits as an output of the second XNOR gate (XNOR2). A second AND gate (AND2) receives the one bit of the third vector and the one bit of the fourth vector to generate a product vector of length N bits as an output of the second AND gate (AND2).

The output of the first XNOR gate (XNOR1) and the output of the first AND gate (AND1) feed as an input of a first multiplexer (MUX1). The output of the first AND gate (AND1) and the output of the second XNOR gate (XNOR2) feed as an input of the third AND gate (AND3). A second multiplexer (MUX2) receives an input from the output of the second XNOR gate (XNOR2), the output of the second AND gate (AND2), and an output of the third AND gate (AND3). An output of the second multiplexer (MUX2) includes only non-zero elements in a dot product operation on the two ternary vectors or all elements in the dot product operation on the two binary vectors (BIT VECTOR3 and BIT VECTOR4). An output of the first multiplexer (MUX1) feeds as an input of the first pop-counter (POPCOUNT1), where the first pop-counter (POPCOUNT1) computes the number of 1s in either the output of the first XNOR gate (XNOR1) or the first AND gate (AND1) that is forwarded to a third multiplexer (MUX3) and a fourth multiplexer (MUX4). The third multiplexer (MUX3) receives a first bit length (represented as BIT LENGTH 1) and the input from the first multiplexer (MUX1) through the first pop-counter (POPCOUNT1). A second pop-counter (POPCOUNT2) computes a number of one value from the output of the second multiplexer (MUX2) that is forwarded to the fourth multiplexer (MUX4), where an output of the second pop-counter (POPCOUNT2) is left shifted by one value.

The fourth multiplexer (MUX4) receives a second bit length (represented as BIT LENGTH 2) and the input from the second multiplexer through a second pop-counter (POPCOUNT2). Further, the left shifted output of the first pop-counter (POPCOUNT1) and the output of the third multiplexer (MUX3) are subtracted in the first subtractor (SUB1). Further, the left shifted output of the second pop-counter (POPCOUNT2) and the output of the fourth multiplexer (MUX4) are subtracted in the second subtractor (SUB2), where an output of the second subtractor (SUB2) indicates the dot-product between the two ternary vectors in case of the ternary data, or two binary vectors (a BIT VECTOR3 and a BIT VECTOR4) in case of the binary data. The output of the first subtractor (SUB1) indicates the dot product between a BIT VECTOR1 and a BIT VECTOR2, in case of the binary data, whereas the output of the first subtractor (SUB1) is not used in case of the ternary data. The output of the second subtractor (SUB2) and an output of the first subtractor (SUB1) are added in the first adder (ADD1), where the output of the first adder (ADD1) denotes a combined inner product result of two pairs of vectors (i.e. pair 1 is {BIT VECTOR1, BIT VECTOR2} and pair 2 is {BIT VECTOR2, BIT VECTOR3}) in case of the binary data. The fifth multiplexer (MUX5) selects the output of the second subtractor (SUB2) in case of the ternary data, and the output of first adder (ADD1) in case of the binary data as output. The output of the fifth multiplexer (MUX5) is further added in the second adder (ADD2) with the first accumulator (ACC) to perform the accumulation operation. and a second adder (ADD2). An output of the second adder is stored in the first accumulator (ACC). Further, the output of the second adder is compared with a threshold in the comparator (COMPARATOR) to generate an output value. In an example, a second accumulator (ACC_D) stores the output of the second adder (ADD2) and compares the output value of the second adder (ADD2) with the threshold at the comparator (COMPARATOR). In an example, the sixth multiplexer (MUX6) receives an input from the second adder and the second accumulator (ACC_D), and where the comparator (COMPARATOR) receives an input from the second accumulator (ACC_D).

The hardware resources needed for the MAC operation on the ternary data can be used for the binary data as well. Since, binary data is represented in 1 bit (instead of 2 bits in case of ternary data), a mask and value pair vectors are used in the TNN, as two independent pairs of vectors, in order to perform inner product operation on binary data. Since, in case of the binary data, processing two independent vectors generate one output each, resulting in the throughput of the BNN twice that of the TNN. Further, the PE supports two different datatypes BNN_A ({0,1}) and BNN_B ({−1, +1}) for MAC operation. With appropriate control signals, thus the fused data path in the PE, which supports the MAC operation on binary as well as ternary data.

In order to support the inner product operation on one of the two inputs with the high precision, an additional data path, i.e. the FPL data path is also included in the PE. One of the input data vector is composed of high precision data and the other input vector is composed of extreme low (i.e. binary or ternary) precision data in case of the FPL data path. So, the PE has two data paths, i.e. the bitwise data path and FPL data path, which have separate output for inner product operation. Based on the data path selection, one of the output (inner product result) of the two data paths is added to an accumulator to complete the MAC operation.

The proposed fused bitwise data path is one of the two data paths inside the PE. The hardware components used for the inner product calculation of the ternary data can be used for the binary data as well. For example, the POPCOUNT logic (both BNN_A and BNN_B), bitwise XNOR logic (for BNN_B), the bitwise AND logic (for BNN_A) etc. When the output of the two POPCOUNT logic shown in the FIG. 6 (at steps 602 and 605), can be used separately, two independent pairs of the binary vectors can be handled for the inner product operation. For example, in case of ternary data, m1, m2, v1, v2 vectors are used to calculate the inner product. In the proposed method, in case of the binary data, the inner product for {m1, m2} and {v1, v2} vector pairs are calculated in parallel. These two inner product results, can be added and result of the addition can be further added with accumulator. In this way, double the throughput is achieved for inner product calculation on the binary data as compared to the ternary data.

Figure 11A:
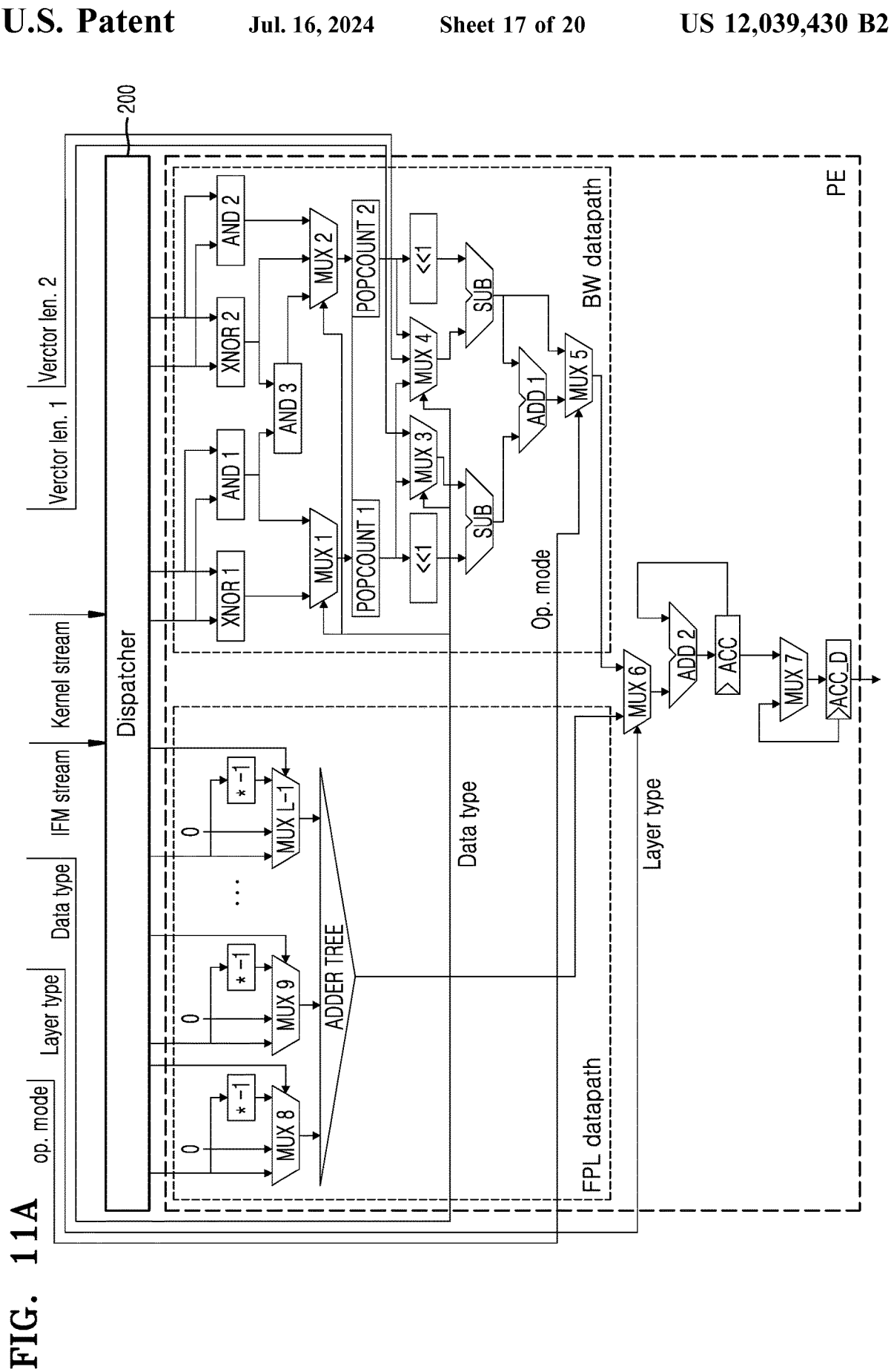
FIG. 11A illustrates a schematic diagram of data paths in a processing engine, according to an example as disclosed herein.

A micro architecture of fused bitwise data path is shown in the FIG. 9A. In this figure the data path with vector length as 16 is showed. However, the method can be extended to any vector length. In this data path the input data are given below, where detailed control signals are shown in FIG. 11A.

a) BIT VETCOR1
b) BIT VECTOR2
c) BIT VECTOR3
d) BIT VECTOR4
e) BIT LENGTH1
f) BIT LENGTH2

As shown in FIG. 9A, input a-d are 4, 16 bit input vectors and e-f are two additional data to denote bit vector length (i.e. how much bit vector out 16, needs to be considered) for input pair {a,b} and {c,d} respectively. The components shown in FIG. 9A and subsequent figures (i.e. FIG. 9B, FIG. 9C), MUX, ADD, SUB, AND, XNOR, POPCOUNT are multiplexer, adder, subtractor, bit wise AND, bit wise XNOR and POPCOUNT logic respectively. The number added as suffix to these logic elements denote instance number (e.g. AND3 denotes 3rd instance of bitwise AND logic). ACC and ACC_D are two accumulators, where ACC is updated at every cycle and ACC_D is updated when all MAC operations on an output data (i.e. OFM) are completed. In subsequent figures FIG. 9B. and FIG. 9C show the active components (highlighted in dark grey) in fused data path when operating on the ternary and the binary data respectively.

Figure 9B:
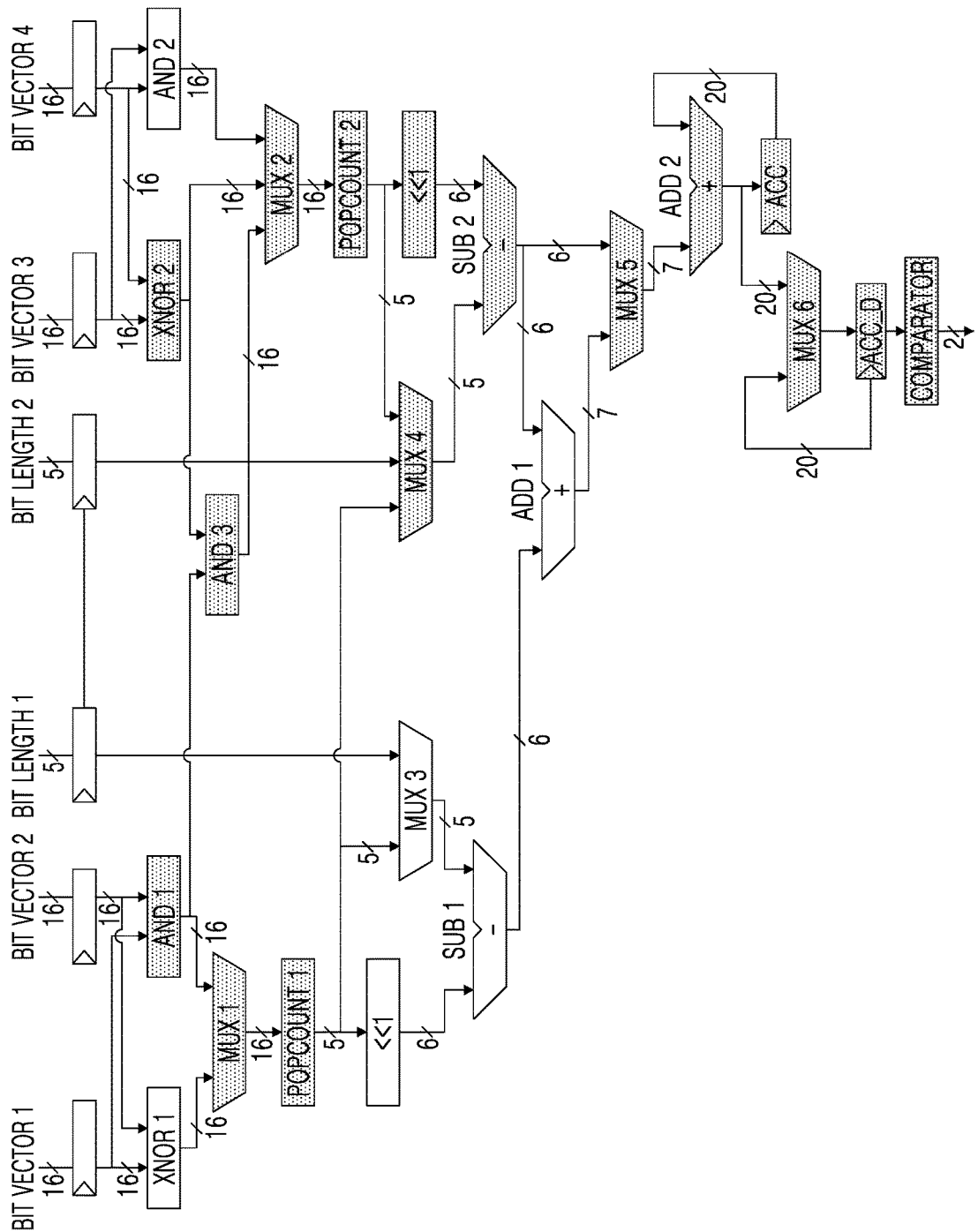
FIG. 9B illustrates a TNN model used by the fused data path engine for performing the MAC operation on the ternary data in a ternary mode, according to an example as disclosed herein.
Figure 9C:
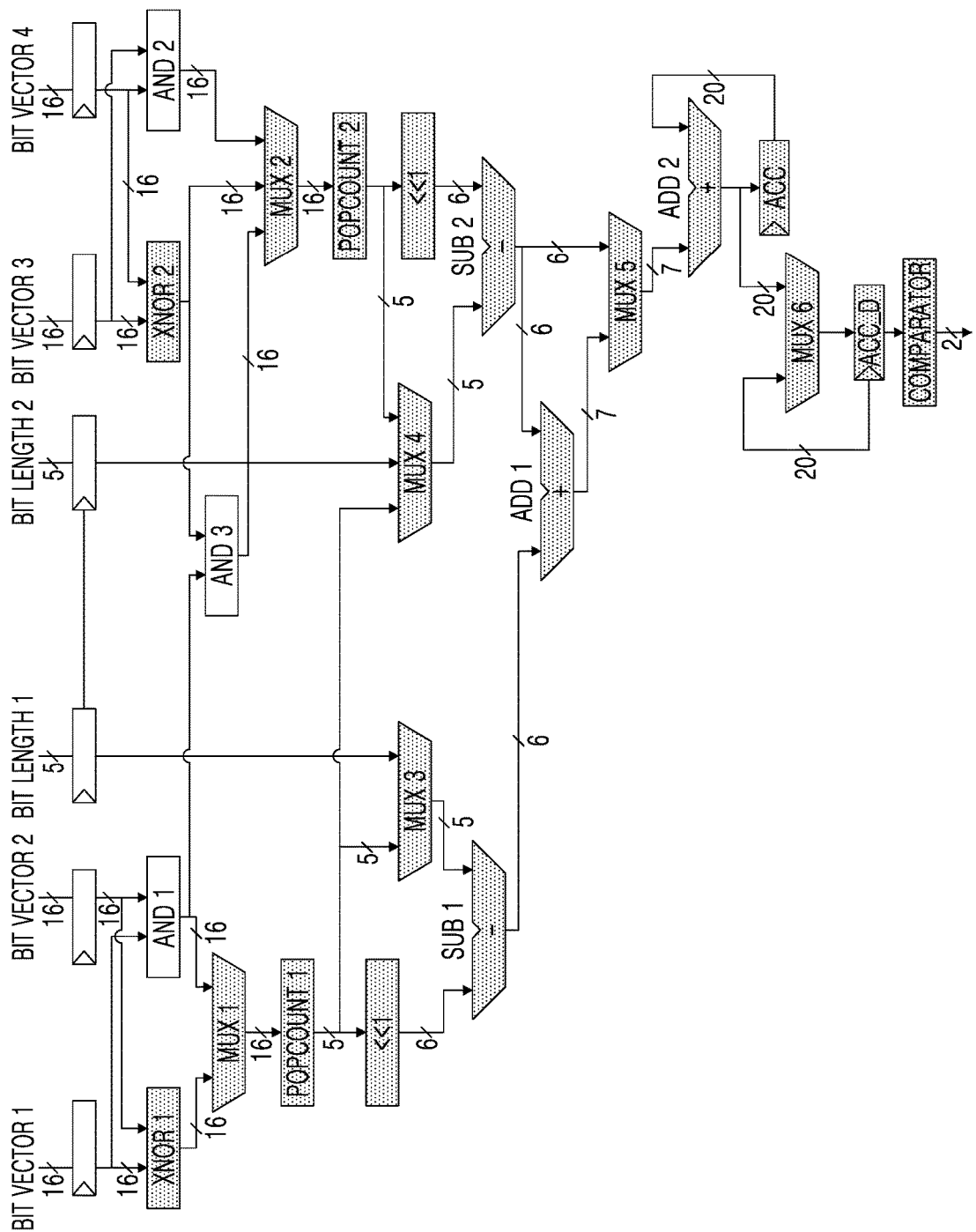
FIG. 9C illustrates a BNN model used by the fused data path engine for performing the MAC operation on the binary data in a binary mode, according to an example as disclosed herein.

FIG. 9B illustrates the TNN model used by the fused data path engine for performing the MAC operation on the ternary data in the ternary mode, according to an example as disclosed herein. The first AND gate (AND1) receives the mask vectors (BIT VECTOR1, BIT VECTOR2) of respective two ternary vectors, with each of length N. Further, the second XNOR gate (XNOR2) receives the value vectors (BIT VECTOR3, BIT VECTOR4) of respective two ternary vectors, with each of length N. Further, the output of the first AND gate (AND1) feed as the input of the first multiplexer (MUX1). Further, the output of the first AND gate (AND1) and the output of the second XNOR gate (XNOR2) feed as the input of the third AND gate (AND3). Further, the second multiplexer (MUX2) receives the input from the output of the second XNOR gate (XNOR2), and the output of the third AND gate (AND3). The output of the second multiplexer (MUX2) selects the output of the third AND gate (AND3), where the output of the second multiplexer (MUX2) comprises non-zero element in the dot product. Further, the fourth multiplexer (MUX4) receives the second bit length (BIT LENGTH 2) and the input from the second multiplexer (MUX2) through the second pop-counter (POPCOUNT2) and the input from the first multiplexer (MUX1) through the first pop-counter (POPCOUNT1).

The second pop-counter (POPCOUNT2) computes the number of one value from the output of the second multiplexer (MUX2) that is forwarded to the fourth multiplexer (MUX4). The output of the second pop-counter (POPCOUNT2) is left shifted by one value. The first pop-counter (POPCOUNT1) computes the non-zero element in the dot product operation that is forwarded to the fourth multiplexer (MUX4), where the fourth multiplexer (MUX4) selects the output of first pop-counter (POPCOUNT1) as the output of the fourth multiplexer (MUX4). The left shifted output of the second pop-counter (POPCOUNT2) and the output of the fourth multiplexer (MUX4) are subtracted in the second subtractor (SUB2). The output of the second subtractor (SUB2) indicates the dot product between the two ternary vectors. The output of the second subtractor (SUB2) provided with the first accumulator (ACC) to perform the accumulation operation using the fifth multiplexer (MUX5) and the second adder. The output of the second adder is stored in the first accumulator (ACC). The output of the second adder (ADD2) is further stored in the second accumulator (ACC_D) and compared with the threshold in the comparator (COMPARATOR) to generate the output value.

In an example, the PE performs the inner product on a pair of data vectors in parallel to improve throughput. The PE performs inner product on the pair of the ternary data vectors (in case of TNN). Each ternary data has two bits, i.e. a mask bit (which denotes the data is zero or not) and a value bit (whether the data represents −1 or +1, represented by 0 and 1 respectively). In this way three possible values (0, −1 and +1) of the ternary data are encoded in 2 bits by (00, 10 and 11 respectively). Further, the 2-bit ternary data vector is split as two separate 1 bit vectors for the mask and the value respectively. Therefore, in order to perform the inner product on the ternary data, the PE receives four 1-bit vectors as input. A pair of input mask bit vectors and input value bit vectors are processed separately to determine the inner product of the two ternary bit vectors. Since, the input data to the PE is passed in the form of bit vectors, an area and power efficient bitwise operation logic (i.e. bitwise OR, bitwise AND, bitwise XNOR etc.) is used instead of multiplier.

The mask vectors of the ternary data are passed in the BIT VECTOR1 and the BIT VECTOR2. The value vectors of the ternary data are passed in the BIT VECTOR3 and BIT VECTOR4. For bit lengths (BIT LENGTH1 and BIT LENGTH2), any value can be passed, as for ternary data, the number of non-zero elements are calculated internally. A bitwise AND operation is performed between the BIT VECTOR1 and the BIT VECTOR2 in the AND1. A bitwise XNOR operation is performed between the BIT VECTOR3 and the BIT VECTOR4 in the XNOR1. The outputs of the AND1 and the XNOR1 are further bitwise ANDed using the AND3. The output of the AND3 has non-zero ternary data and is passed through the MUX2. The POPCOUNT2 counts number of 1's in the output bit vector from the MUX2. The output of the POPCOUNT2 is further left shifted by 1. This left shift logic output is one of the input for the SUB2 subtractor. Another input for the SUB2 is generated from the MUX4 output. The MUX4 passes through the POPCOUNT1 output (which counts the number of 1's in the MUX2's output, i.e. the output of the AND1). The output of the MUX4 denotes number of non-zero elements in the resultant vector after the inner product between the two ternary vectors. Hence, the output of the SUB2 generates the final result of the inner product calculation on the ternary data. The output of the SUB2 is further fed to the MUX5. The MUX5 receives the input from the SUB2 (which generates result for inner product operation on ternary data) and the ADD1 (which generates result for inner product operation on binary data). Based on mode (i.e. binary or ternary), either of the output (i.e. SUB2 or ADD1) will be passed through the MUX5. Thus, in case of the ternary mode, the output of the SUB2 is passed. The output of the MUX5 is a result during multiplication phase of the MAC operation. The accumulation phase is done by adding the output of the MUX5 with the ACC in the ADD2. When all the MAC operations are completed, the output of the ACC is stored in the ACC_D. The ACC_D stores the final value of the OFM which is further compared with the threshold and generates the 2 bit ternary data (i.e. 00, 10 or 11).

FIG. 9C illustrates the BNN model used by the fused data path engine for performing the MAC operation on the binary data in the binary mode, according to an example as disclosed herein. The first XNOR gate (XNOR1) receives the one bit of the first vector (BIT VECTOR1) and the one bit of the second vector (BIT VECTOR2) to generate the product vector of length N bits as the output of the first XNOR gate (XNOR1). Further, the second XNOR gate (XNOR2) receives the one bit of the third vector (BIT VECTOR3) and the one bit of the fourth vector (BIT VECTOR4) to generate the product vector of length N bits as the output of the second XNOR gate (XNOR2). Further, the output of the first XNOR gate (XNOR1) feeds as the input of the first multiplexer (MUX1). Further, the output of the second XNOR gate (XNOR2) feed as the input of the second multiplexer (MUX2).

Further, the third multiplexer (MUX3) receives the first bit length (BIT LENGTH1) and the input from the first multiplexer through the first pop-counter (POPCOUNT1), the output of the first multiplexer feeds as the input of the first pop-counter (POPCOUNT1). The first pop-counter (POPCOUNT1) computes the number of 1's in the resultant vector after performing the dot product between the BIT VECTOR1 and the BIT VECTOR2 on the binary data, that is forwarded to the third multiplexer (MUX3) and the fourth multiplexer (MUX4). The fourth multiplexer (MUX4) receives the second bit length (BIT LENGTH2) and the input from the first multiplexer through the second pop-counter (POPCOUNT2). The second pop-counter (POPCOUNT2) computes the number of 1's in the resultant vector (i.e. the output of the second multiplexer (MUX2)) after performing the dot product between the BIT VECTOR3 and the BIT VECTOR4 on the binary data, that is forwarded to the fourth multiplexer (MUX4). The output of the second pop-counter (POPCOUNT2) is left shifted by one value. The left shifted output of the first pop-counter (POPCOUNT1) and the output of the third multiplexer (MUX3) are subtracted in the first subtractor (SUB1), where the output of the first subtractor (SUB1) denotes the dot product value between the BIT VECTOR1 and the BIT VECTOR2, on the binary data.

Further, the left shifted output of the second pop-counter (POPCOUNT2) and the output of the fourth multiplexer (MUX4) are subtracted in the second subtractor (SUB2), where the output of the second subtractor (SUB2) denotes the dot product value between the BIT VECTOR3 and the BIT VECTOR4, on the binary data. The output of the second subtractor (SUB2) and the output of the first subtractor (SUB1) are added in the first adder (ADD1) with the first accumulator (ACC) to perform the accumulation operation using the fifth multiplexer (MUX5) and the second adder. The output of the second adder is stored in the first accumulator (ACC). The output of the second adder is compared with the threshold in the comparator (COMPARATOR) to generate the output value.

In an example, when the binary datatype is {0,1} (i.e. BNN_A), then the output of the first pop-counter (POPCOUNT1) is passed through a left shifter and the third multiplexer (MUX3), whereas the output of the second pop-counter (POPCOUNT2) is passed through a left shifter and the fourth multiplexer (MUX4). Further, the left shifted output from the first pop-counter (POPCOUNT1) and the output from the third multiplexer are subtracted from each other in the first subtractor (SUB1). Further, the left shifted output from the second pop-counter (POPCOUNT2) and the output from the fourth multiplexer are subtracted from each other in the second subtractor (SUB2). In this way, the output of the first subtractor (SUB1) and the second subtractor (SUB2) provides POPCOUNT1 and POPCOUNT2 values which are the dot product result on the two binary vectors of the BNN_A datatype.

In an example, when the binary datatype is {−1,1}, then the output of the first pop-counter (POPCOUNT1) is passed through the left shifter and the first bit length (BIT LENGTH1) is passed through the third multiplexer, whereas the output of the second pop-counter (POPCOUNT2) is passed through the left shifter and the second bit length (BIT LENGTH2) is passed through the fourth multiplexer. Further, the first subtractor (SUB1) subtracts output of the third multiplexer from the left shifted output of the first pop-counter (POPCOUNT1) to compute the dot product between the first bit vector and the second bit vector. Further, the second subtractor (SUB2) subtracts output of the fourth multiplexer from the left shifted output of the second pop-counter (POPCOUNT2) to compute the dot product between the third bit vector and the fourth bit vector. In this way, the output of the first subtractor (SUB1) and the second subtractor (SUB2) provides ((POPCOUNT1«1)–BIT LENGTH1) value and ((POPCOUNT2«1)–BIT LENGTH2) value which are the dot product result on the two binary vectors of the BNN_B datatype.

In an example scenario, the electronic device 1000 that includes fused data path is more area efficient with respect to a baseline hardware with 2×2 integer multiplier hardware for performing the binary dot product and the ternary dot product. In an example scenario, a power efficiency of the electronic device 1000 with respect to existing accelerator increases with increasing dimension of the PE array 400 of the electronic device 1000.

Two independent vector pairs are {BIT VECTOR1, BIT VECTOR2} and {BIT VECTOR3, BIT VECTOR4} for binary data are used to calculate inner product on binary data. Inner product on BNN_B datatype: The active components (highlighted in dark grey) are used to calculate inner product on BNN_B datatype. In the fused data path two vector pairs are processed independently in two separate data flows. One data flow (to the left of BIT LENGTH 1) follows as XNOR1, MUX1, POPCOUNT1, left shift logic, SUB1 sequence. The other data flow (to the right of BIT LENGTH 2) follows as XNOR2, MUX2, POPCOUNT2, left shift logic, SUB2 sequence. These two data flow outputs are added in ADD1. For BNN_B data type, bit length is required in order to determine the valid bit length. Hence, for the two sequences BIT LENGTH1 and BIT LENGTH2 are passed through MUX3 and MUX4 respectively.

Inner product on BNN_A datatype: In case of the BNN_A datatype bitwise AND operation is needed instead of bitwise XNOR operation (as shown in the FIG. 1). Due to this, the two data flows mentioned for BNN_B are changed slightly. The left data flow for BNN_A datatype is the AND1, the MUX1, the POPCOUNT1, the left shift logic, the SUB1. The right data flow for BNN_A datatype is the AND2, the MUX2, the POPCOUNT2, the left shift logic, the SUB2. Note that, for the BNN_A datatype the bit length and the left shift logic are not needed, because the output of the POPCOUNT logic itself generates the result of inner product. To cancel the effect of the left shift logic on the output of the POPCOUNT, the POPCOUNT value is left shifted and subtracted from its old value. For example, in case of left flow, the output of POPCOUNT1 is subtracted from the output of the left shift logic. Hence, for left and right data flow, through the MUX3 and the MUX4, output of the POPCOUNT1 and the POPCOUNT2 are passed. Similar to the BNN_B datatype, the output of the SUB1 and the SUB2 are added in the ADD1.

The output of the ADD1 denotes the result of the inner product on the binary data (either of BNN_A or BNN_B). In case of the binary mode, the output of the ADD1 is passed through the MUX5. The output of the MUX5 is a result during multiplication phase of the MAC operation. The accumulation phase is done by adding the output of the MUX5 with the ACC in the ADD2. When all the MAC operations are completed, the output of the ACC is stored in the ACC_D. The ACC_D stores the final value of the OFM which is further compared with the threshold to generate the 1 bit binary data (i.e. 0 or 1).

Figure 10:
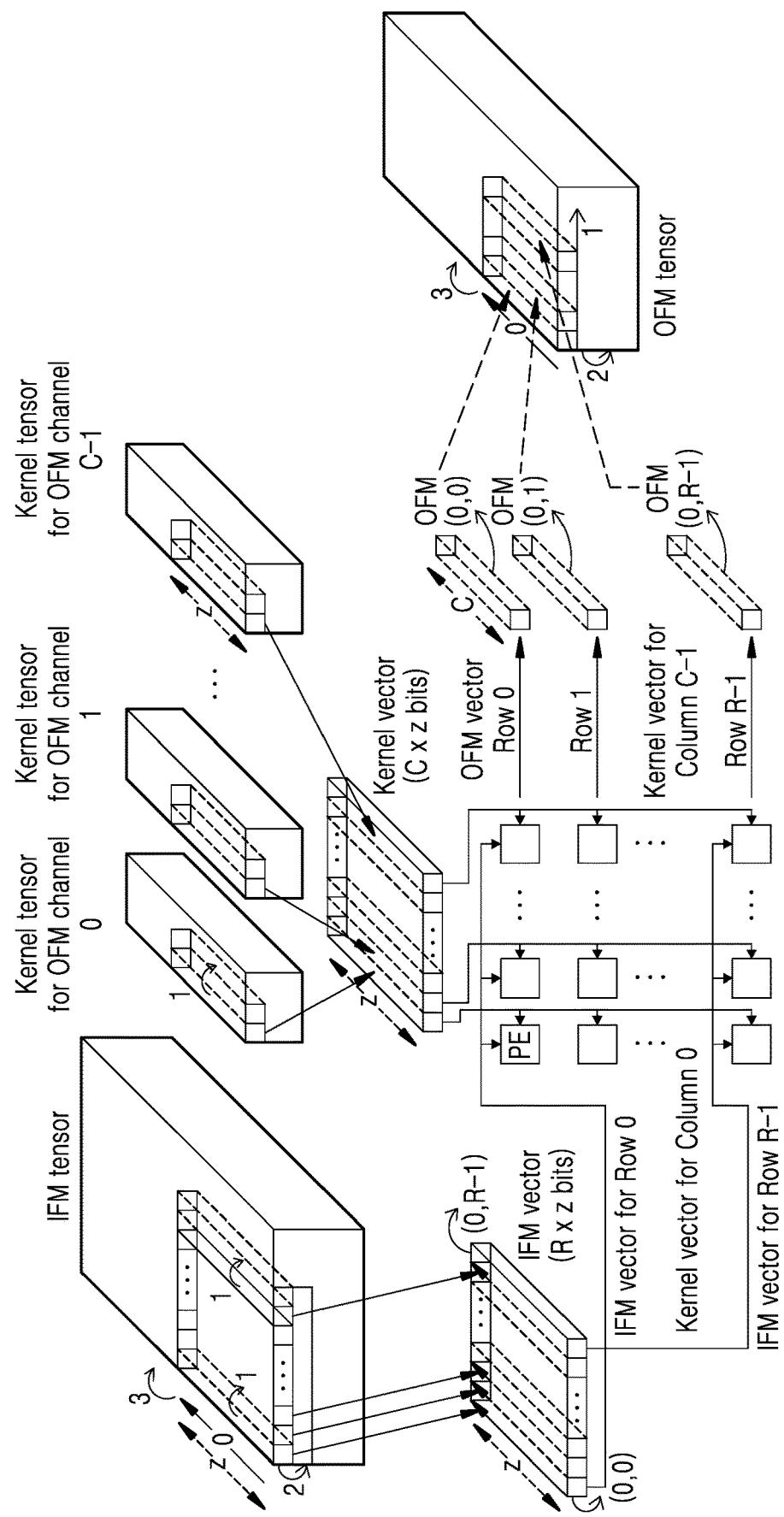
FIG. 10 illustrates a schematic diagram of a traversal in loop format, according to an example as disclosed herein.

FIG. 10 illustrates a schematic diagram of a traversal in a loop format, according to an example as disclosed herein. Generating the OFM by the PE array is shown in the FIG. 10. The controller 100 performs the loop traversal, using which the sequence of the SRAM addresses is generated, in order to fetch the IFM and the kernel data. The loop traversal is explained using the FIG. 10. Steps to perform the traversal in the loop format are given below:

Step 1: for ofm_ch in range (0, C, OCH)
Step 2: for ofm_h in range(0, 1, OH)
Step 3: for ofm_w in range (0, R, OW)
Step 4: if BNN, ch_step=vector_length×2
Step 5: else ch_step=vector_length
Step 6: for ifm_ch in range (0, ch_step, ICH)
Step 7: for k_h in range (0, 1, KH)
Step 8: for k_w in range (0, 1, KW)
Step 9: OFM[ofm_ch: (ofm_ch+C), ofm_h, ofm_w: (ofm_w+R)]+=matrix_mul IFM[ifm_ch: (ifm_ch+ch_step), ifm_h+k_h, (ifm_w+k_w): (ifm_w+k_w)+R], kernel[ofm_ch: (ofm_ch+C), ifm_ch: (ifm_ch+ch_step), k_h, k_w])

At the step 1, OFM channel update is performed (marked as 3 at OFM tensor in FIG. 10). At the step 2, OFM height update is performed (marked as 2 at the OFM tensor in the FIG. 10). At the step 3, OFM width update (marked as 1 at the OFM tensor in FIG. 10) is performed. At the step 4, channel step update is performed for 2 stream processing for the binary data (i.e. for BNN). At the step 5, channel step update is performed for 1 stream processing for the ternary data (i.e. for TNN). At the step 6, IFM channel update is performed (marked as 3 at IFM tensor in FIG. 10). At the step 7, Kernel height update is performed (marked as 2 at the IFM tensor in FIG. 10). At the step 8, Kernel width update is performed (marked as 1 at the IFM tensor in FIG. 10). At the step 9, OFM tile of size 1×R×C is generated.

The OFM three-dimensional tensor is generated in a tile format with maximum dimension of 1×R×C, where R and C are row and column dimensions of the PE array. In order to generate an OFM tile, KW×KH×ICH amount of IFM tensor is fetched in the IFM by performing steps 6-8, where KW, KH and ICH are kernel width, kernel height and the IFM channel respectively. The channel step used for BNN is twice of the number used for TNN, where each ternary data is represented by 2 bits. Rest of the OFM tensor is generated first in row major order for C amount of OFM channels by performing the steps 2-3, followed by completing OCH amount of OFM channels.

FIG. 11A illustrates a schematic diagram of data paths in the PE, according to an example as disclosed herein. The FPL data path and the fused bitwise data path are available inside each PE, in order to support the FPL and the bitwise layer respectively. The FPL data path performs dot product between the full precision IFM data and one of the binary kernel data and the ternary kernel data. The output of one of the FPL data path and the fused data path is selected for accumulation based on a layer type, where the layer type is a full precision layer or a hidden layer. The fused data path performs the dot product between the Kernel data and the IFM data, where the Kernel data and the IFM data are represented in the binary data or the ternary data.

In the FPL, the IFM vector is used in full precision (i.e. not in binary or ternary) format, whereas kernel vector is used as either in binary or ternary format. The full precision IFM vector is generally used in input layer whose channel number is less (i.e. 3 for image processing). In the bitwise layer, both IFM and kernel vectors are used in either in binary or ternary format. Inputs to the PE includes the mode, a layer type, a data type, an IFM stream, a kernel stream, a vector length 1, and a vector length 2. The mode is either the binary operation mode or the ternary operation mode. The layer type is either the FPL or the bitwise layer. The data type is either a BNN_A data type or a BNN_B data type. The IFM stream provides a vector of the IFM data to the dispatcher 200. The kernel stream provides a vector of the kernel data to the dispatcher 200. The vector length 1 is the vector length of the IFM stream. The vector length 2 is the vector length of the kernel stream. The dispatcher 200 cause to supply required data for both data paths. A working mechanism of dispatcher 200 is more described in FIGS. 12A-12B. The electronic device packs full precision IFM data using the IFM and kernel staging registers which are already used in case of the fused bitwise data path. Therefore, no additional storage is needed to store the full precision IFM data.

In case of FPL data path, the dot product operation is expressed using the equation given below:

Dot product$(A,W)$=sum$(Ai \times Wi)$ where, i=1 to n, Ai$\in$R and Wi$\in$\{-1, 0, +1\} (for ternary data) or [\{-1, +1\} (for BNN_B) or \{0,1\} (for BNN_A)].

The multiplication can be avoided by updating Ai value and sum them up, where three possible values of Ai are 0, -Ai and +Ai. Therefore, three inputs (i.e. IFM vector, 0, negated IFM vector) are given to the multiplexers MUX8, MUX9, MUX L-1 in the FPL data path as shown in the FIG. 11. A control of the multiplexers MUX8, MUX9, MUX L-1 is based on the value of the kernel vector (i.e. Wi). Further, outputs from the multiplexers MUX8, MUX9, MUX L-1 are summed up using an adder tree in the FPL data path. An output of adder tree is the dot product. In order to perform accumulation operation, output from the FPL data path (i.e. the output of the adder tree) and the fused data path are selected using a multiplexer MUX6 whose selection is based on the layer type. Further, an output the multiplexer MUX6 is added with an accumulator value to generate a new accumulator value.

The FPL data path in the PE supports the typical inner product operation (where one of the operands, is represented in higher precision). The vector of high precision IFM data and the vector of lower precision (binary or ternary) kernel data are received as inputs at the FPL data path. For the high precision IFM data, when element wise multiplication is performed between the IFM (Ai) and the kernel either in binary (bi) or ternary (ti) precision, the output of the multiplication can be either same (Ai), negated (-Ai) or zero. By this principle, each of the multiplexers (MUX8, MUX9, MUX L-1), pass through either of the IFM values. The outputs of each of the multiplexers are further added using the adder tree (i.e. ADDER TREE). The output of the ADDER TREE, denotes the result of inner product operation on high precision IFM data.

Two data paths inside the PE is shown in the FIG. 11A. Output from each data path are selected using the MUX6 multiplexer. In the FIGS. 9A, 9B and 9C, the logic units below the MUX5 (i.e. ADD2, ACC, MUX6, ACC_D) are shown for the completeness of the fused bitwise data path of the PE. In the final design of the PE, those units are shared by both the data paths. Hence, those logic units are placed outside to both data paths (i.e. below the MUX6 in the FIG. 11A).

Figure 11B:
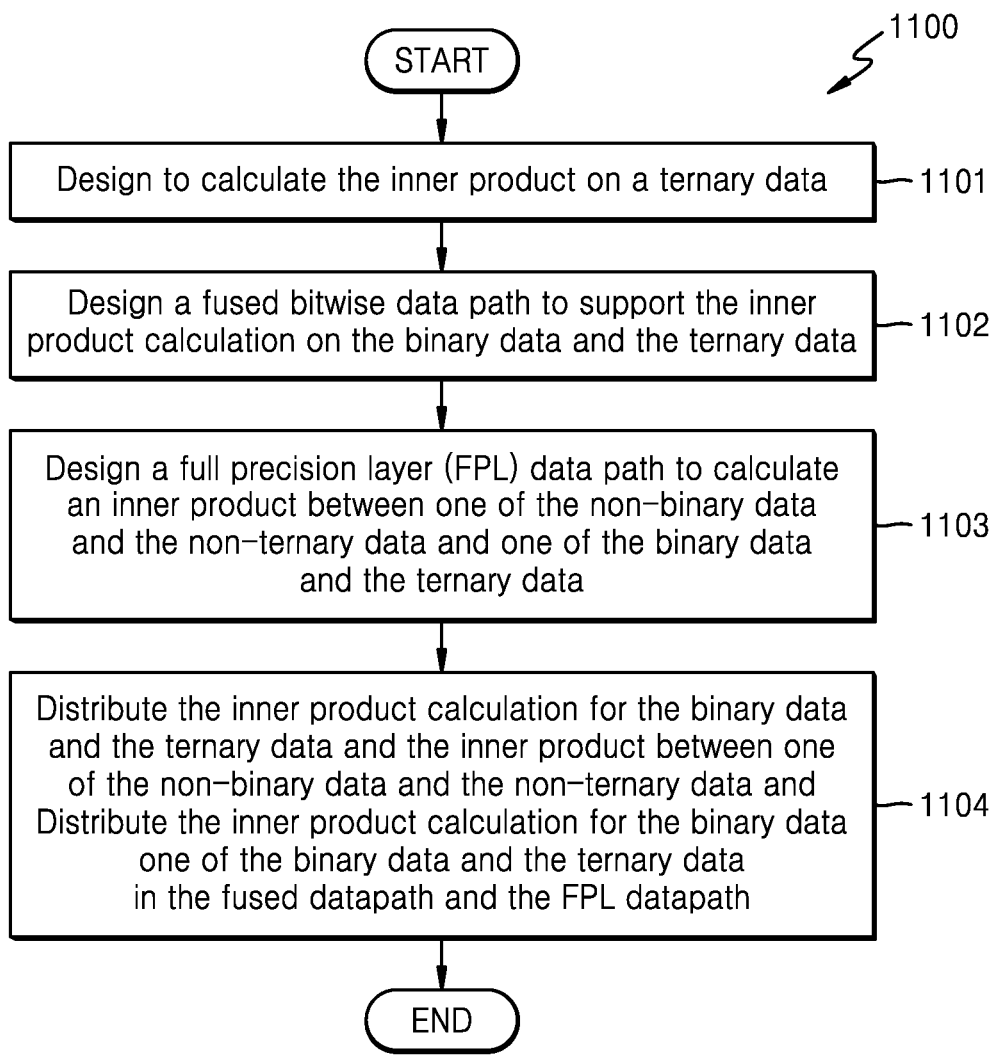
FIG. 11B is a flow diagram illustrates a method for computing the inner product on the binary data, the ternary data, the non-binary data, and the non-ternary data using the electronic device, according to an example as disclosed herein.

FIG. 11B is a flow diagram illustrates a method for computing the inner product on the binary data, the ternary data, the non-binary data, and the non-ternary data using the electronic device, according to an example as disclosed herein. At step 1101, the method includes designing to calculate the inner product on the ternary data. At step 1102, the method includes designing the fused bitwise data path to support the inner product calculation on the binary data and the ternary data. At step 1103, the method includes designing the FPL data path to calculate the inner product between one of the non-binary data and the non-ternary data and one of the binary data and the ternary data. At step 1104, the method includes distributing the inner product calculation for the binary data and the ternary data and the inner product between one of the non-binary data and the non-ternary data and one of the binary data and the ternary data in the fused data path and the FPL data path.

In an example, the electronic device 1000 designs the fused data path to support the inner product calculation for the binary data and the ternary data by receiving one of the ternary data and the binary data, determining the mode of operation for the ternary data and the binary data, processing at least one of the ternary data and the binary data in the XNOR gate (XNOR1-XNOR2) and the AND gate (AND1-AND5) using at least one popcount logic (POPCOUNT1-POPCOUNT2) based on the determined mode of the operation, receiving at least one of the processed ternary data and the processed binary data to the accumulator, and generating at least one of the final ternary value and the final binary value.

In an example, the electronic device 1000 processes at least one of the ternary data and the binary data in the XNOR gate (XNOR1-XNOR2) and the AND gate (AND1-AND3) using the at least one popcount logic (POPCOUNT1-POPCOUNT2) based on the determined mode of the operation, when the fused data path engine 403 of the electronic device 1000 is configured to support the binary data used by the BNN model and the ternary data used by the TNN model. The electronic device 1000 receives one bit of the first vector and one bit of the second vector, using the first XNOR gate (XNOR1), to generate the product vector of length N bits as the output of the first XNOR gate (XNOR1).

The electronic device 1000 receives the one bit of the first vector and the one bit of the second vector, using the first AND gate (AND1), to generate the product vector of length N bits as the output of the first AND gate (AND1). The electronic device 1000 receives one bit of the third vector and one bit of the fourth vector, using the second XNOR gate (XNOR2), to generate the product vector of length N bits as the output of the second XNOR gate (XNOR2).

The electronic device 1000 receives the one bit of the third vector and the one bit of the fourth vector, using the second AND gate (AND2), to generate the product vector of length N bits as the output of the second AND gate (AND2). The electronic device (1000) feeds the output of the first XNOR gate (XNOR1) and the output of the first AND gate (AND1) as the input of the first multiplexer (MUX1), where the output of the first multiplexer (MUX1) includes of the mask vector of the resultant inner product between two ternary vectors in case of the ternary data or the resultant inner product vector of the first binary vector pair (BIT VECTOR 1 and BIT VECTOR 2) in case of the binary data.

The electronic device 1000 feeds the output of the first AND gate (AND1) and the output of the second XNOR gate (XNOR2) as the input of the third AND gate (AND3). The electronic device 1000 receives the input from the output of the second XNOR gate (XNOR2), the output of the second AND gate (AND2), and the output of the third AND gate (AND3) using the second multiplexer (MUX2), where the output of the second multiplexer (MUX2) includes the value vector of the resultant inner product of the two ternary vector pairs which is only affected by non-zero element pairs from the value vector of the input ternary vector pairs in case of the ternary data, where the output of second multiplexer (MUX2) includes the resultant inner product vector of the second binary vector pair (BIT VECTOR 3 and BIT VECTOR 4) in case of the binary data.

The electronic device 1000 receives the first bit length and the input from the first multiplexer (MUX1) through the first pop-counter (POPCOUNT1), where the output of the first multiplexer (MUX1) feeds as the input of the first pop-counter (POPCOUNT1), where the first pop-counter (POPCOUNT1) computes the number of 1s in the resultant mask vector in case of the ternary data and the number of 1s in the resultant inner product vector in case of the binary data which is forwarded to the third multiplexer (MUX3), in case of the binary data and forwarded to the fourth multiplexer (MUX4), in case of the ternary data.

The electronic device 1000 receives the second bit length, the output from the first multiplexer (MUX1) and the second pop-counter (POPCOUNT2) to the fourth multiplexer (MUX4), where the second pop-counter (POPCOUNT2) computes the number of one value from the output of the second multiplexer (MUX2) that is forwarded to the fourth multiplexer (MUX4), where the output of the second pop-counter (POPCOUNT2) is left shifted by one value, where the output of fourth multiplexer (MUX4) includes of either the output from the first pop-counter (POPCOUNT1) in case of the ternary data or the second bit length in case of the binary data type B or the output from the second pop-counter (POPCOUNT2) in case of the binary data type A.

The left shifted output of the first pop-counter (POPCOUNT1) and the output of the third multiplexer (MUX3) are subtracted in the first subtractor (SUB1), where the output of the first subtractor (SUB1) denotes the inner product value of the two binary vector pair (BIT VECTOR 1 and BIT VECTOR2). The left shifted output of the second pop-counter (POPCOUNT2) and the output of the fourth multiplexer (MUX4) are subtracted in the second subtractor (SUB2), where the output of the second subtractor (SUB2) indicates the inner product value between two ternary vector pair, in case of the ternary data or the inner product value between the second binary vector pair (BIT VECTOR 3 and BIT VECTOR4) in case of the binary data.

The output of the second subtractor (SUB2) and the output of the first subtractor (SUB1) are added in the first adder (ADD1) in case of the binary data, where the output of the fifth multiplexer (MUX5) selects either the output from the first adder (ADD1) in case of the binary data, or the output from the second subtractor (SUB2) in case of the ternary data, where the output of the fifth multiplexer (MUX5) is added with the first accumulator (ACC) using the second adder (ADD2). The output of the second adder (ADD2) is stored in the first accumulator (ACC), where the output of the second adder (ADD2) is compared with the threshold in the comparator (COMPARATOR) to generate the output value.

In an example, the electronic device 1000 processes at least one of the ternary data and the binary data in the XNOR gate (XNOR1-XNOR2) and the AND gate (AND1-AND3) using the at least one popcount logic (POPCOUNT1-POPCOUNT2) based on the determined mode of the operation, when the fused data path engine 403 of the electronic device 1000 is configured to support the ternary data used by the TNN model (900B). The electronic device 1000 receives one bit of the first vector and one bit of the second vector, using the first AND gate (AND1), to generate the product vector of length N bits as the output of the first AND gate (AND1).

The electronic device 1000 receives one bit of the third vector and one bit of the fourth vector using the second XNOR gate (XNOR2) to generate the product vector of length N bits as the output of the second XNOR gate (XNOR2). The electronic device 1000 feeds the output of the first AND gate (AND1) as the input of the first multiplexer (MUX1). The electronic device 1000 feeds the output of the first AND gate (AND1) and the output of the second XNOR gate (XNOR2) as the input of the third AND gate (AND3). The electronic device 1000 receives the input from the output of the second XNOR gate (XNOR2), and the output of the third AND gate (AND3) using the second multiplexer (MUX2), where the output of the second multiplexer (MUX2) includes elements in the resultant bit vector obtained from bitwise operation between two ternary vectors.

The electronic device 1000 receives the second bit length and the input from the second multiplexer (MUX2) through the second pop-counter (POPCOUNT2) and the input from the first multiplexer (MUX1) through the first pop-counter (POPCOUNT1) using the fourth multiplexer (MUX4), where the second pop-counter (POPCOUNT2) computes the number of one value from the output of the second multiplexer (MUX2) that is forwarded to the fourth multiplexer (MUX4), where the output of the second pop-counter (POPCOUNT2) is left shifted by one value, where the first pop-counter (POPCOUNT1) computes the number of ones in the bit vector obtained after bitwise AND operation between mask vectors of the two ternary data that is forwarded to the fourth multiplexer (MUX4), where the first bit vector and the second bit vector are the mask vectors, where the value of number of ones denote the number of non-zero values obtained after the dot-product operation between the two ternary vectors.

The left shifted output of the second pop-counter (POPCOUNT2) and the output of the fourth multiplexer (MUX4) are subtracted in the second subtractor (SUB2) to remove the impact of zero element in the output of the second subtractor (SUB2), where the output of the second subtractor (SUB2) is the result of dot product operation performed on the two ternary vectors. The output of the second subtractor (SUB2) is provided with the first accumulator (ACC) to perform the accumulation operation using the fifth multiplexer (MUX5) and the second adder (ADD2). The output of the second adder (ADD2) is stored in the first accumulator (ACC), where the output of the second adder (ADD2) is compared with the threshold in the comparator (COMPARATOR) to generate the output value.

In an example, the electronic device 1000 processes at least one of the ternary data and the binary data in the XNOR gate (XNOR1-XNOR2) and the AND gate (AND1-AND5) using the at least one popcount logic (POPCOUNT1-POPCOUNT2) based on the determined mode of the operation, when the fused data path engine 403 of the electronic device 1000 is configured to support the binary data used by the BNN model (900C). The electronic device 1000 receives one bit of the first vector and one bit of the second vector using the first XNOR gate (XNOR1), to generate the product vector of length N bits as the output of the first XNOR gate (XNOR1). The electronic device 1000 receives one bit of the third vector and one bit of the fourth vector, using the second XNOR gate (XNOR2), to generate the product vector of length N bits as the output of the second XNOR gate (XNOR2).

The electronic device 1000 feeds the output of the first XNOR gate (XNOR1) as the input of the first multiplexer (MUX1). The electronic device 1000 feeds the output of the second XNOR gate (XNOR2) as the input of the second multiplexer (MUX2), where the output of the second multiplexer (MUX2) includes the resultant bit-vector obtained after the bitwise XNOR operation between the third bit vector and the fourth bit vector. The electronic device 1000 receives the first bit length and the input from the first multiplexer (MUX1) through the first pop-counter (POPCOUNT1) using the third multiplexer (MUX3), where the output of the first multiplexer (MUX1) feeds as the input of the first pop-counter (POPCOUNT1), where the first pop-counter (POPCOUNT1) computes the number of one value obtained in the bit vector from the output of the first multiplexer (MUX1) that is forwarded to the third multiplexer (MUX3) and the fourth multiplexer (MUX4).

The electronic device 1000 receives the second bit length and the input from the first multiplexer (MUX1) through the first pop-counter (POPCOUNT1) and the input from the second multiplexer (MUX2) through the second pop-counter (POPCOUNT2), where the second pop-counter (POPCOUNT2) computes the number of one value from the output of the second multiplexer (MUX2) that is forwarded to the fourth multiplexer (MUX4), where the output of the second pop-counter (POPCOUNT2) is left shifted by one value. The left shifted output of the first pop-counter (POPCOUNT1) and the output of the third multiplexer (MUX3) are subtracted in the first subtractor (SUB1), where the output of the first subtractor (SUB1) indicates the dot-product between the first bit vector and the second bit vector. The left shifted output of the second pop-counter (POPCOUNT2) and the output of the fourth multiplexer (MUX4) are subtracted in the second subtractor (SUB2), where the output of the second subtractor (SUB2) indicates the dot-product between the third bit vector and the fourth bit vector. The output of the second subtractor (SUB2) and the output of the first subtractor (SUB1) are added in the first adder (ADD1) with the first accumulator (ACC) to perform the accumulation operation using the fifth multiplexer (MUX5) and the second adder (ADD2). The output of the second adder (ADD2) is stored in the first accumulator (ACC), where the output of the second adder (ADD2) is compared with the threshold in the comparator (COMPARATOR) to generate the output value.

In an example, the electronic device 1000 distributes the inner product calculation for the binary data and the ternary data and the inner product between one of the non-binary data and the non-ternary data and one of the binary data and the ternary data in the fused data path and the FPL data path by designing to combine the bitwise data path and the FPL data path to form the PE, and distributing required data for multiple PEs of the two-dimensional PE array, using the dispatcher 200 to support both the bitwise data path and the FPL data path without the additional storage overhead. The PE computes the inner product between the pair of binary or ternary data inside the bitwise data path, or the inner product between one full precision data and one binary or ternary data inside the FPL data path.

The various actions, acts, blocks, steps, or the like in the flow diagram 1100 may be performed in the order presented, in a different order or simultaneously. Further, in some examples, some of the actions, acts, blocks, steps, or the like may be omitted, added, modified, skipped, or the like.

Figure 12A:
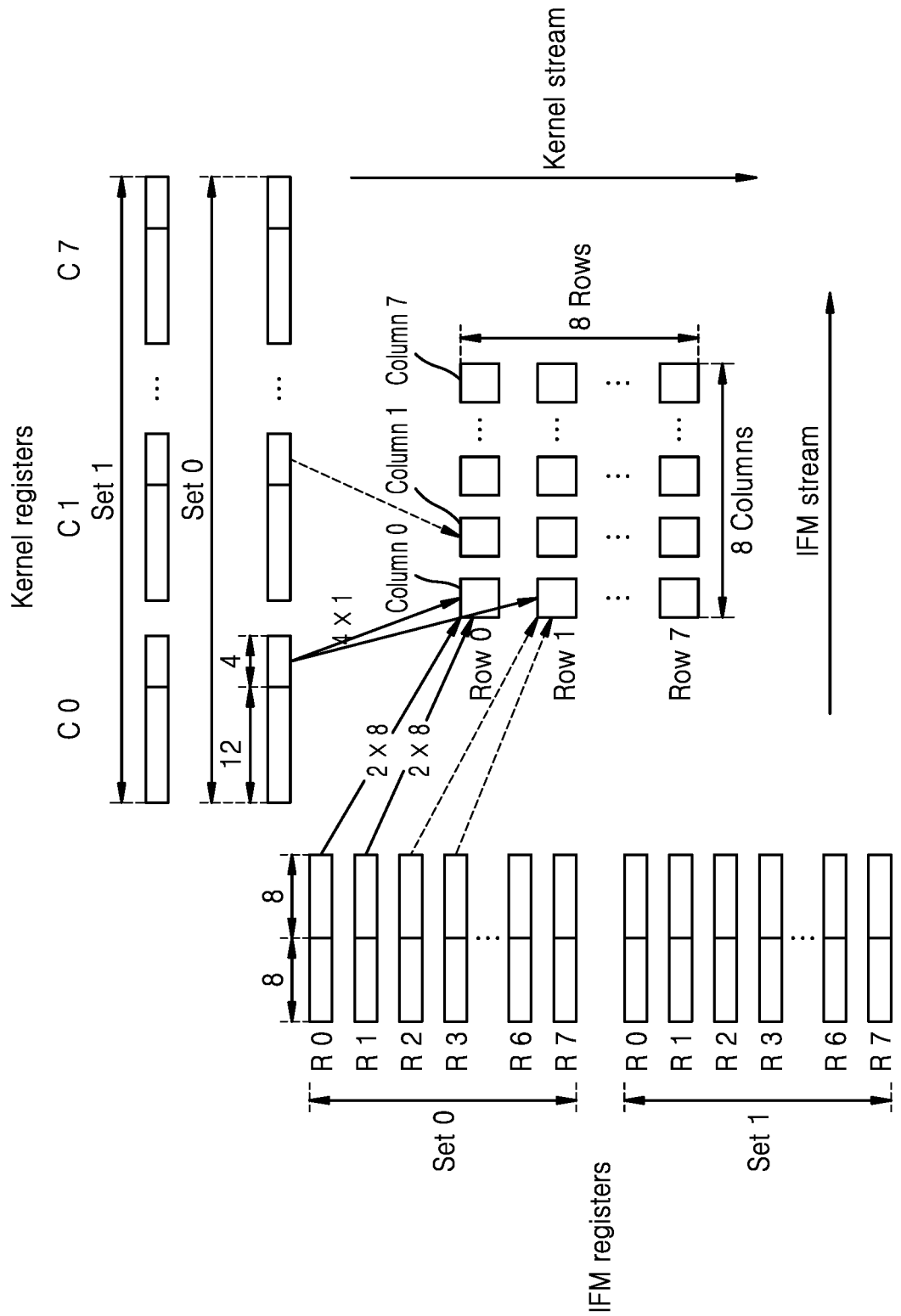
FIG. 12A is a schematic diagram illustrating steps performing by a dispatcher for a data delivery using a full precision layer data path, according to an example as disclosed herein.

FIG. 12A is a schematic diagram illustrating steps performing by the dispatcher for the data delivery using the full precision layer data path, according to an example as disclosed herein. The PE array 400 has two register sets for storing the IFM stream and the kernel stream, i.e. Set 0 and Set 1. Number of registers for storing the IFM vector and the kernel vector in a set are equal to row and column of the PE array 400 respectively. Consider, the electronic device 1000 with the PE array dimension is 8×8, vector length is 16 bit, and full precision IFM bit width is 8. The PE array 400 has 2×8 (i.e. Set 0 and Set1) IFM registers and kernel registers. Size of each register is 16 bit. The IFM registers and the kernel registers are shown vertically and horizontally respectively in the FIG. 12A. The IFM data broadcasts across the rows of the PE array 400 and the kernel data is broadcasts across the columns of the PE array 400.

The IFM vector is broadcasted to a row is composed of two registers, whereas the kernel vector is broadcasted to a column is composed of one register. For example, row 0 receives the IFM vector from R0, R1 of the Set 0. Further, row 1 receives the IFM vector from R2, R3 of the Set 0. Likewise, row 7 receives IFM vector from R6, R7 of the Set 1. Since IFM bit width is 8, each IFM register contains 2 IFM data. So, the IFM vector length is 4 (i.e. 2 from each register). In order to perform dot product, the kernel vector length has to be also same as IFM vector length, i.e. 4. So, the 4 or 8 bit for binary or ternary format of the kernel data is packed in each kernel register. In this example, any one of the sets are used for kernel registers. Column 0 receives the kernel data from C0. Column 1 receives the kernel data from C1. Likewise, column 7 receives the kernel data from C7 register. So, in this example, each PE can perform 4 dot product operations in every cycle.

Figure 12B:
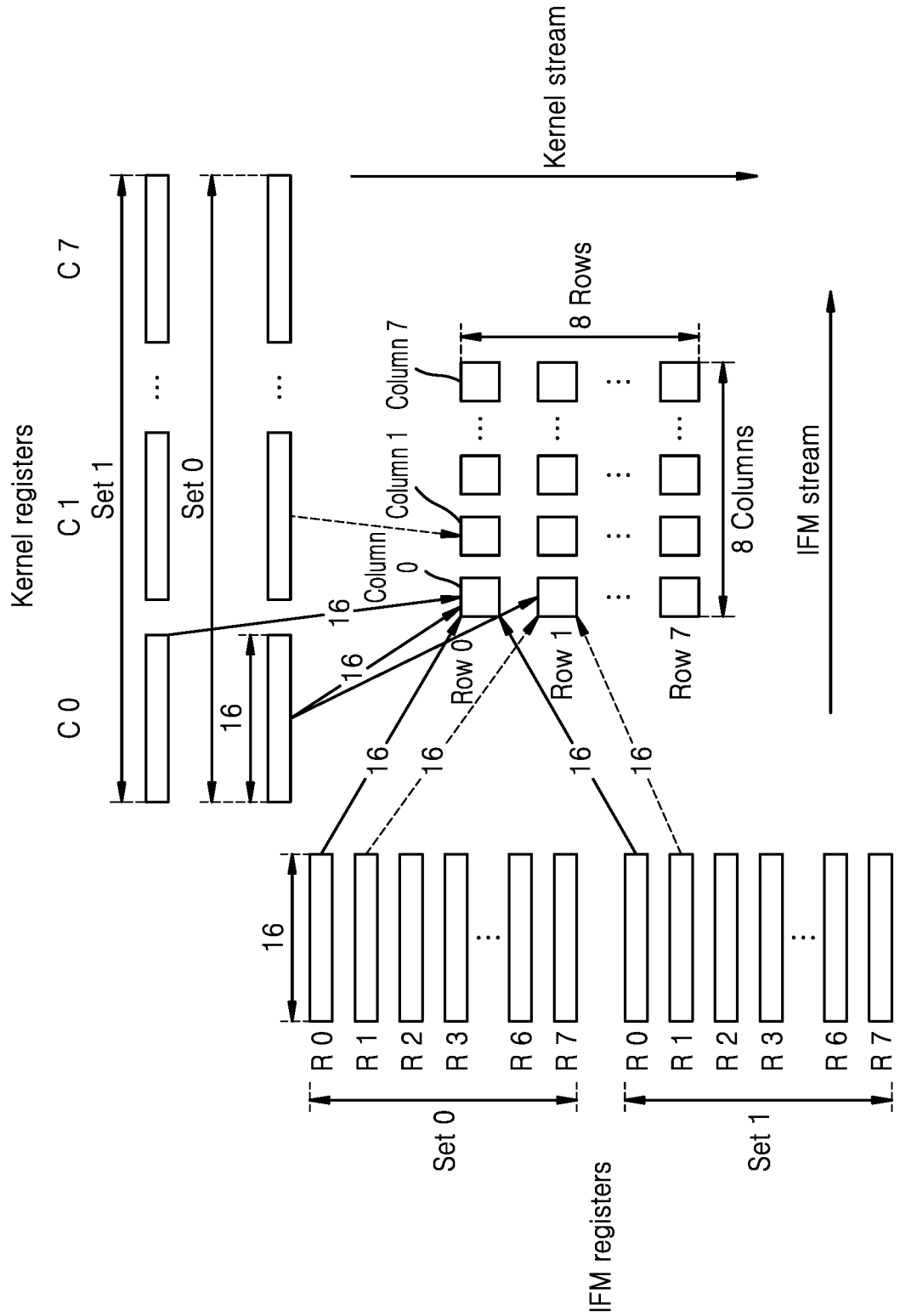
FIG. 12B is a schematic diagram illustrating steps performing by the dispatcher for the data delivery using a fused bitwise data path, according to an example as disclosed herein.

In order to improve performance and data reuse, a number of PEs are organized in a two-dimensional array. This PE array 400 follows Single Instruction Multiple Data (SIMD) based architecture and does not follow data flow-based architecture (e.g. systolic array), as adjacent PEs in the PE array 400 do not communicate with each other. To improve input data reuse, the IFM data vector is shared across different columns of the PE array 400, whereas the kernel vector is shared across different rows of the PE array 400. All input data are stored in staging registers. The staging registers are placed at the edge (left and top) of the PE array 400. In an R×C dimensional PE array 400, (where R and C are rows and columns PE array 400), there are R and C number of staging registers to store IFM and kernel data respectively. In the proposed design there are two sets (set 0 and set 1) of staging registers. The dispatcher 200 distributes the input data from the staging registers to each PE in the PE array 400, based on data path selection (i.e. FPL or fused bitwise), without any additional storage overhead. In FIGS. 12A and 12B show data distribution scheme for FPL and fused bitwise data paths respectively. For the example, each staging register bit width is considered as 16 and IFM data precision is considered as 8 bit. A PE array dimension is considered as 8×8. However, the proposed method works for any register bit width, IFM data precision and PE array dimension.

In FIG. 12A shows the data distribution scheme for FPL data path. As per the given example, two 8-bit IFM data are packed together in each 16-bit IFM staging register. 4 IFM data are formed to generate the IFM vector and shared across all columns of the particular row of the PE array 400. For example, R0, R1 of set 0 generate the IFM vector for 0th row of the PE array 400. Likewise, R2, R3 of set 0 for 1st row of the PE array 400; R6, R7 of set 1 for 7th row of the PE array 400. For, kernel each staging register uses 4 (binary) or 8 (ternary) bits of entire 16 bits. Hence, for this example only one set of staging register is used for kernel data supply. In this example, C0 of set 0 register supplies kernel data to all rows of 0th column of the PE array 400. Likewise, C1 of set 0 supplies to 1st column, C7 of set0 supplies to 7th column of the PE array 400. So, in this example each PE in the FPL data path, performs 4 elementwise operations (i.e. IFM and kernel data pair) in parallel.

FIG. 12B is a schematic diagram illustrating steps performing by the dispatcher for the data delivery using the fused bitwise data path, according to an example as disclosed herein. The PE array 400 has the two register sets for storing the IFM stream and the kernel stream, i.e. Set 0 and Set 1. The number of registers for storing the IFM vector and the kernel vector in the set are equal to the row and the column of the PE array 400 respectively. Consider, the electronic device 1000 with the PE array 400 dimension is 8×8, the vector length is 16 bit, and the full precision IFM bit width is 8. The PE array 400 has the 2×8 (i.e. Set 0 and Set1) IFM registers and kernel registers. The size of each register is 16 bit. The IFM registers and the kernel registers are shown vertically and horizontally respectively in the FIG. 12B. The IFM data broadcasts across the rows of the PE array 400 and the kernel data is broadcasts across the columns of the PE array 400, are stored in two registers. For example, the row 0 receives the IFM vector from the R0 registers of the Set 0 and the Set 1. Likewise, the row 7 receives the IFM vector from the R7 registers of the Set 0 and the Set 1. The column 0 receives the kernel vector from the C0 of the Set 0 and the Set 1. Likewise, Column 7 gets kernel vector from C7 of Set 0 and Set 1. Since each register is of size 16 bits, each PE can perform 32 (2×16) and 16 dot product operations in every cycle, in case of binary and ternary data respectively.

The FIG. 12B shows the data distribution scheme for fused bitwise data path. Unlike the FPL data path, for the fused bitwise data path, two sets of staging registers are used for the data supply to PE array 400. Since, each PE has to receive 4 input data (2 for the IFM and 2 for the kernel), two registers from the IFM and the kernel are used to supply the required data. In this example, two registers are used to supply two independent IFM vectors (in case of binary) or one IFM vector (in case of ternary), to all columns of the particular row of the PE array 400. Similarly, two registers are used to supply two independent kernel vectors (in case of binary data) or one kernel vector (in case of ternary data), to all rows of the particular column of PE array 400. As an example, {R0, R1} of set0 provides IFM data to 0th row of the PE array, {R6, R7} of set1 provides IFM data to 7th row of the PE array 400. For kernel data, {C0, C0} of set0 and set1 supplies to 0th column, {C1, C1} of set 0 and set 1 supplies to 1st column etc. In this example, each PE in fused bitwise data path performs 32 (in case of binary data) or 16 (in case of ternary data) element wise operations in parallel.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for computing an inner product on a binary data, a ternary data, a non-binary data, and a non-ternary data, comprising:
   calculating, by an electronic device, the inner product on the ternary data;
   designing, by the electronic device, a fused bitwise data path to support the inner product calculation on the binary data and the ternary data;
   designing, by the electronic device, a Full Precision Layer (FPL) data path to calculate an inner product between one of the non-binary data and the non-ternary data and one of the binary data and the ternary data; and
   distributing, by the electronic device, the inner product calculation for the binary data and the ternary data and the inner product between one of the non-binary data and the non-ternary data and one of the binary data and the ternary data respectively in the fused bitwise data path and the FPL data path,
   wherein the fused bitwise data path is configured to support the inner product calculation for the binary data and the inner product calculation for the ternary data.

2. The method as claimed in claim 1, wherein designing the fused bitwise data path to support the inner product calculation for the binary data and the ternary data comprises:
   receiving, by the electronic device, one of the ternary data and the binary data;
   determining, by the electronic device, a mode of operation for the ternary data and the binary data;
   processing, by the electronic device, at least one of the ternary data and the binary data in a XNOR gate and a AND gate using at least one popcount logic based on the determined mode of the operation;
   receiving, by the electronic device, at least one of the processed ternary data and the processed binary data to an accumulator; and
   generating, by the electronic device, at least one of a final ternary value and a final binary value.

3. The method as claimed in claim 2, further comprising processing, by the electronic device, at least one of the ternary data and the binary data in the XNOR gate and the AND gate using the at least one popcount logic based on the determined mode of the operation, when a fused data path engine of the electronic device is configured to support the binary data used by a Binary Neural Network (BNN) model and the ternary data used by a Ternary Neural Network (TNN) model;
   receiving one bit of a first vector and one bit of a second vector, using a first XNOR gate, to generate a product vector of length N bits as an output of the first XNOR gate;
   receiving the one bit of the first vector and the one bit of the second vector, using a first AND gate, to generate a product vector of length N bits as an output of the first AND gate;

receiving one bit of a third vector and one bit of a fourth vector, using a second XNOR gate, to generate a product vector of length N bits as an output of the second XNOR gate;

receiving the one bit of the third vector and the one bit of the fourth vector, using a second AND gate, to generate a product vector of length N bits as an output of the second AND gate;

feeding the output of the first XNOR gate and the output of the first AND gate as an input of a first multiplexer, wherein an output of the first multiplexer comprises of a mask vector of a resultant inner product between two ternary vectors in case of the ternary data or the resultant inner product vector of a first binary vector pair in case of the binary data;

feeding the output of the first AND gate and the output of the second XNOR gate as an input of a third AND gate;

receiving an input from the output of the second XNOR gate, the output of the second AND gate, and an output of the third AND gate using a second multiplexer, wherein an output of the second multiplexer comprises a value vector of the resultant inner product of the two ternary vector pairs which is only affected by non-zero element pairs from the value vector of the input ternary vector pairs in case of the ternary data, wherein the output of second multiplexer comprises a resultant inner product vector of a second binary vector pair in case of the binary data;

receiving a first bit length and the input from the first multiplexer through a first pop-counter, wherein the output of the first multiplexer feeds as an input of the first pop-counter, wherein the first pop-counter computes the number of 1 s in the resultant mask vector in case of the ternary data and the number of 1s in the resultant inner product vector in case of the binary data which is forwarded to the third multiplexer, in case of the binary data and forwarded to a fourth multiplexer, in case of the ternary data; and receiving the second bit length, the output from the first multiplexer and a second pop-counter to the fourth multiplexer, wherein the second pop-counter computes a number of one value from the output of the second multiplexer that is forwarded to the fourth multiplexer, wherein an output of the second pop-counter is left shifted by one value, wherein the output of fourth multiplexer comprises either the output from the first pop-counter in case of the ternary data or the second bit length in case of the binary data type B or the output from the second pop-counter in case of the binary data type A, wherein the left shifted output of the first pop-counter and the output of the third multiplexer are subtracted in a first subtractor, wherein an output of the first subtractor denotes the inner product value of the first binary vector pair, wherein the left shifted output of the second pop-counter and the output of the fourth multiplexer are subtracted in a second subtractor, wherein an output of the second subtractor indicates the inner product value between two ternary vector pair, in case of the ternary data or the inner product value between the second binary vector pair in case of the binary data, wherein the output of the second subtractor and the output of the first subtractor are added in a first adder in case of the binary data, wherein the output of a fifth multiplexer selects either the output from the first adder in case of the binary data, or the output from the second subtractor in case of the ternary data, wherein the output of the fifth multiplexer is added with a first accumulator using a second adder, and wherein an output of the second adder is stored in the first accumulator, wherein the output of the second adder is compared with a threshold in a comparator to generate an output value.

4. The method as claimed in claim 3, further comprising processing, by the electronic device, at least one of the ternary data and the binary data in the XNOR gate and the AND gate using the at least one popcount logic based on the determined mode of the operation, when the fused data path engine of the electronic device is configured to support the ternary data used by TNN model;

receiving one bit of a first vector and one bit of a second vector, using the first AND gate, to generate a product vector of length N bits as an output of the first AND gate;

receiving one bit of a third vector and one bit of a fourth vector using the second XNOR gate to generate a product vector of length N bits as an output of the second XNOR gate;

feeding the output of the first AND gate as an input of the first multiplexer;

feeding the output of the first AND gate and the output of the second XNOR gate as an input of the third AND gate;

receiving the input from the output of the second XNOR gate, and an output of the third AND gate using the second multiplexer, wherein an output of the second multiplexer comprises elements in a resultant bit vector obtained from bitwise operation between two ternary vectors; and receiving a second bit length and an input from the second multiplexer through the second pop-counter and the input from the first multiplexer through the first pop-counter using the fourth multiplexer, wherein the second pop-counter computes a number of one value from the output of the second multiplexer that is forwarded to the fourth multiplexer, wherein an output of the second pop-counter is left shifted by one value, wherein the first pop-counter computes the number of ones in the bit vector obtained after bitwise AND operation between mask vectors of the two ternary data that is forwarded to the fourth multiplexer, wherein a first bit vector and a second bit vector are the mask vectors, wherein a value of number of ones denote a number of non-zero values obtained after the dot-product operation between the two ternary vectors, wherein the left shifted output of the second pop-counter and the output of the fourth multiplexer are subtracted in the second subtractor to remove an impact of zero element in an output of the second subtractor, wherein the output of the second subtractor is a result of dot product operation performed on the two ternary vectors, wherein the output of the second subtractor is provided with the first accumulator to perform an accumulation operation using a fifth multiplexer and the second adder, and wherein an output of the second adder is stored in the first accumulator, wherein the output of the second adder is compared with a threshold in the comparator to generate an output value.

5. The method as claimed in claim 3, further comprising processing, by the electronic device, at least one of the ternary data and the binary data in the XNOR gate and the AND gate using the at least one popcount logic based on the determined mode of the operation, when the fused data path engine of the electronic device is configured to support the binary data used by the BNN model;

receiving one bit of a first vector and one bit of a second vector using the first XNOR gate, to generate a product vector of length N bits as an output of the first XNOR gate;

receiving one bit of a third vector and one bit of a fourth vector, using the second XNOR gate, to generate a product vector of length N bits as an output of the second XNOR gate;

feeding the output of the first XNOR gate as an input of the first multiplexer;

feeding the output of the second XNOR gate as an input of the second multiplexer, wherein an output of the second multiplexer comprises a resultant bit-vector obtained after a bitwise XNOR operation between the third vector and the fourth vector;

receiving a first bit length and the input from the first multiplexer through the first pop-counter using the third multiplexer, wherein an output of the first multiplexer feeds as an input of the first pop-counter, wherein the first pop-counter computes a number of one value obtained in the bit vector from the output of the first multiplexer that is forwarded to the third multiplexer and the fourth multiplexer; and receiving a second bit length and the input from the first multiplexer through the first pop-counter and the input from the second multiplexer through the second pop-counter, wherein the second pop-counter computes a number of one value from the output of the second multiplexer that is forwarded to the fourth multiplexer, wherein an output of the second pop-counter is left shifted by one value, wherein the left shifted output of the first pop-counter and the output of the third multiplexer are subtracted in the first subtractor, wherein an output of the first subtractor indicates the dot-product between the first vector and the second vector, wherein the left shifted output of the second pop-counter and the output of the fourth multiplexer are subtracted in the second subtractor, wherein the output of the second subtractor indicates the dot-product between the third vector and the fourth vector, wherein the output of the second subtractor and the output of the first subtractor are added in the first adder with the first accumulator to perform an accumulation operation using the fifth multiplexer and the second adder, and wherein an output of the second adder is stored in the first accumulator, wherein the output of the second adder is compared with a threshold in the comparator to generate an output value.

6. The method as claimed in claim 3, wherein the dot product performs computation for Multiply and Accumulate (MAC) operation in the BNN model and the TNN model.

7. The method as claimed in claim 1, wherein the FPL data path performs dot product between a full precision Input Feature Map (IFM) data and one of a binary kernel data and a ternary kernel data.

8. The method as claimed in claim 1, wherein an output of one of the FPL data path and the fused bitwise data path is selected for accumulation based on a layer type, where the layer type is a full precision layer or a hidden layer.

9. The method as claimed in claim 1, wherein the fused bitwise data path performs a dot product between a Kernel data and an Input Feature Map (IFM) data where the Kernel data and the IFM data are represented in the binary data or the ternary data.

10. The method as claimed in claim 1, wherein distributing, by the electronic device, the inner product calculation for the binary data and the ternary data and the inner product between one of the non-binary data and the non-ternary data and one of the binary data and the ternary data in the fused data path and the FPL data path, comprises:

combining, by the electronic device, the fused bitwise data path and the FPL data path to form a Processing Element (PE), where the PE computes the inner product between a pair of binary or ternary data inside the bitwise data path, or the inner product between one full precision data and one binary or ternary data inside the FPL data path; and distributing, by the electronic device, required data for multiple PEs of a two-dimensional PE array, using a dispatcher to support both the bitwise data path and the FPL data path without an additional storage overhead.

11. An electronic device for computing an inner product on a binary data, a ternary data, a non-binary data, and a non-ternary data, comprising:

a Static Random-Access Memory (SRAM);

at least one controller configured to send address to the SRAM;

a Processing Engine (PE) array; and a dispatcher configured to receive at least one SRAM data and forward the at least one SRAM data to the PE array, wherein the PE array comprises a PE array controller, an Output Feature Map (OFM) combiner, and a fused data path engine, and wherein the fused data path engine is configured to provide a fused data path for a Binary Neural Network (BNN) model and a Ternary Neural Network (TNN) model, including combining data paths for the BNN model and the TNN model into a single fused data path.

12. The electronic device as claimed in claim 11, wherein the BNN model is used to compute the inner product on a pair of binary data, and the TNN model is used to compute the inner product on the ternary data.

13. The electronic device as claimed in claim 11, wherein the fused data path engine comprises:

a first AND gate, a second AND gate, and a third AND gate;

a first XNOR gate and a second XNOR gate;

a first multiplexer, a second multiplexer, a third multiplexer, a fourth multiplexer, a fifth multiplexer, and a sixth multiplexer;

a first subtractor and a second subtractor;

a first pop-counter and a second pop-counter;

a first adder and a second adder;

a first accumulator and a second accumulator; and a comparator, wherein the first XNOR gate receives one bit of a first vector and one bit of a second vector, wherein the second XNOR gate receives one bit of a third vector and one bit of a fourth vector, wherein the first AND gate receives the one bit of the first vector and the one bit of the second vector, wherein the second AND gate receives the one bit of the third vector and the one bit of the fourth vector, wherein the third AND gate receives inputs from the first AND gate and the second XNOR gate, wherein the first multiplexer receives inputs from the first XNOR gate and the first AND gate, wherein the second multiplexer receives inputs from the second XNOR gate, the second AND gate, and the third AND gate, wherein the third multiplexer receives a first bit length, and an input from the first multiplexer through the first pop-counter, wherein the fourth multiplexer receives a second bit length, an input from the first multiplexer through the first pop-counter, and an input from the second multiplexer through the second pop-counter, wherein the first subtractor receives a left shifted output of the first pop-counter and an output of the third multiplexer, wherein the second subtractor receives a left shifted output of the second pop-counter and the output of the fourth multiplexer, wherein the first adder receives inputs from the first subtractor and the second subtractor, wherein the fifth multiplexer receives an input from the first adder and the second subtractor, wherein the second adder receives inputs from the fifth multiplexer and the first accumulator, wherein the sixth multiplexer receives an input from the second adder and the second accumulator, wherein the comparator receives an input from the second accumulator, and wherein the fused data path engine is configured to perform at least one of:

support at least one of: the binary data used by the BNN model and the ternary data used by the TNN model, combine data paths for the BNN model and the TNN model into a single fused data path, process a ternary data in bitwise manner, and combine data paths for the BNN model and the TNN model operating on data-types into the single fused data path.

14. The electronic device as claimed in claim 13, wherein when the fused data path engine is configured to support the binary data used by the BNN model and the ternary data used by the TNN model, the first XNOR gate receives the one bit of the first vector and the one bit of the second vector to generate a product vector of length N bits as an output of the first XNOR gate, the first AND gate receives the one bit of the first vector and the one bit of the second vector to generate a product vector of length N bits as an output of the first AND gate, the second XNOR gate receives the one bit of the third vector and the one bit of the fourth vector to generate a product vector of length N bits as an output of the second XNOR gate, the second AND gate receives the one bit of the third vector and the one bit of the fourth vector to generate a product vector of length N bits as an output of the second AND gate, the output of the first XNOR gate and the output of the first AND gate feed as the input of the first multiplexer, wherein an output of the first multiplexer comprises either the output of the first XNOR gate in case of a binary data type B or the output of the first AND gate in case of a binary data type A and the ternary data, the output of the first AND gate and the output of the second XNOR gate feed as an input of the third AND gate, the second multiplexer receives the input from the output of the second XNOR gate, the output of the second AND gate, and an output of the third AND gate, wherein an output of the second multiplexer comprises the output of the third AND gate in case of the ternary data or the output of the second XNOR gate in case of the binary data type B or the output of the second AND gate in case of the binary data type A, the third multiplexer receives the first bit length and the input from the first multiplexer through the first pop-counter, the output of the first multiplexer feeds as an input of the first pop-counter, wherein the first pop-counter computes the non-zero element using a bit vector obtained by either bitwise operation performed by the first XNOR gate or bitwise operation performed by the first AND gate that is forwarded to the third multiplexer and the fourth multiplexer, the fourth multiplexer receives the second bit length and the input from the first multiplexer through the first pop-counter, the input from second multiplexer through the second pop-counter, wherein the second pop-counter computes a number of one value from the output of the second multiplexer that is forwarded to the fourth multiplexer, wherein an output of the second pop-counter is left shifted by one value, the left shifted output of the first pop-counter and the output of the third multiplexer are subtracted in the first subtractor, the left shifted output of the second pop-counter and the output of the fourth multiplexer are subtracted in the second subtractor, wherein the output of the second subtractor indicates the inner product value between two ternary vector pair in case of the ternary data or the inner product value between a second binary vector pair in case of the binary data, the output of the second subtractor and an output of the first subtractor are added in the first adder with the first accumulator to perform an accumulation operation using the fifth multiplexer and the second adder, wherein the output of the first adder is to support the binary data used by the BNN model, wherein the output of the second subtractor is the input of the fifth multiplexer for supporting the ternary data used by the TNN model, and an output of the second adder is stored in the first accumulator, wherein the output of the second adder is compared with a threshold in the comparator to generate an output value.

15. The electronic device as claimed in claim 14, wherein the dot product performs computation for Multiply and Accumulate (MAC) operation on the binary data and the ternary data.

16. The electronic device as claimed in claim 13, wherein when the fused data path engine is configured to support the ternary data used by the TNN model, the first AND gate receives the one bit of the first vector and the one bit of the second vector to generate a product vector of length N bits as an output of the first AND gate, the second XNOR gate receives the one bit of the third vector and the one bit of the fourth vector to generate a product vector of length N bits as an output of the second XNOR gate, the output of the first AND gate feed as the input of the first multiplexer, the output of the first AND gate and the output of the second XNOR gate feed as the input of the third AND gate, the second multiplexer receives the input from the output of the second XNOR gate, and an output of the third AND gate, wherein an output of the second multiplexer comprises non-zero element in a resultant bit vector obtained from the bitwise operation between two ternary vectors, the fourth multiplexer receives the second bit length and the input from the second multiplexer through the second pop-counter and the input from the first multiplexer through the first pop-counter, wherein the second pop-counter computes a number of one value from the output of the second multiplexer that is forwarded to the fourth multiplexer, wherein an output of the second pop-counter is left shifted by one value, wherein the first pop-counter computes a non-zero element in the resultant bit vector obtained from the bitwise operation between the two ternary vectors that is forwarded to the fourth multiplexer, the left shifted output of the second pop-counter and the output of the fourth multiplexer are subtracted in the second subtractor to remove an impact of zero elements in the output of second subtractor, wherein the output of the second subtractor is the result of the dot product operation performed on two ternary vectors, wherein the output of the fourth multiplexer is the output of the first pop-counter, an output of the second subtractor provided with the first accumulator to perform an accumulation operation using the fifth multiplexer and the second adder, and an output of the second adder is stored in the first accumulator, wherein the output of the second adder is compared with a threshold in the comparator to generate an output value.

17. The electronic device as claimed in claim 13, wherein when the fused data path engine is configured to support the binary data used by the BNN model, the first XNOR gate receives the one bit of the first vector and the one bit of the second vector to generate a product vector of length N bits as an output of the first XNOR gate, the second XNOR gate receives the one bit of the third vector and the one bit of the fourth vector to generate a product vector of length N bits as an output of the second XNOR gate, the output of the first XNOR gate feeds as the input of the first multiplexer, wherein the output of first multiplexer comprises a bit vector after a bitwise XNOR operation on the first vector and the second vector, the output of the second XNOR gate feed as the input of the second multiplexer, wherein an output of the second multiplexer comprises a resultant bit-vector obtained after a bitwise XNOR operation between third and fourth vector, the third multiplexer receives the first bit length and the input from the first multiplexer through the first pop-counter, an output of the first multiplexer feeds as an input of the first pop-counter, wherein the first pop-counter computes a number of ones in the bit vector obtained after the bitwise XNOR operation between the first vector and the second vector in the dot product operation that is forwarded to the third multiplexer and the fourth multiplexer, the fourth multiplexer receives the second bit length and the input from the first multiplexer through the first pop-counter, the input from the second multiplexer through the second pop-counter, wherein the second pop-counter computes a number of ones in the bit vector obtained after the bitwise XNOR operation between the third vector and the fourth vector from the output of the second multiplexer that is forwarded to the fourth multiplexer, wherein an output of the second pop-counter is left shifted by one value, the left shifted output of the first pop-counter and the output of the third multiplexer are subtracted in the first subtractor, wherein an output of the first subtractor indicates the dot-product between the first bit vector and the second bit vector, wherein the output of the third multiplexer is a first bit length, the left shifted output of the second pop-counter and the output of the fourth multiplexer are subtracted in the second subtractor, wherein the output of the second subtractor indicates the dot-product between the third vector and the fourth vector, wherein the output of the fourth multiplexer is a second bit length, an output of the second subtractor and an output of the first subtractor are added in the first adder with the first accumulator to perform an accumulation operation using the fifth multiplexer and the second adder, and an output of the second adder is stored in the first accumulator, wherein the output of the second adder is compared with a threshold in the comparator to generate an output value.

18. The electronic device as claimed in claim 11, wherein the dispatcher is configured to forward data to a full precision layer data path and the fused data path, wherein the FPL data path and the fused data path are combined together to form a PE in the PE array.

19. The electronic device as claimed in claim 18, wherein the FPL data path performs dot product between a full precision IFM layer and one of a binary kernel stream and a ternary kernel stream.

20. The electronic device as claimed in claim 18, wherein an output of one of the FPL data path and the fused data path is selected for accumulation based on a layer type, where the layer type is a full precision layer or a hidden layer.

21. The electronic device as claimed in claim 18, wherein the fused data path performs a dot product between a Kernel data and an IFM data, where the Kernel data and the IFM data are represented in a binary data or a ternary data.

22. The electronic device as claimed in claim 11, wherein the PE array performs a plurality of MAC operations on the data provided by the dispatcher in parallel.

* * * * *